(12) United States Patent
Richardson

(10) Patent No.: US 11,079,614 B2
(45) Date of Patent: Aug. 3, 2021

(54) ROTATIONALLY STABILIZED CONTACT LENS WITH IMPROVED COMFORT AND IMPROVED STABILIZATION UTILIZING OPTIMIZED STIFFNESS PROFILES

(71) Applicant: Johnson & Johnson Vision Care, Inc., Jacksonville, FL (US)

(72) Inventor: Gary Richardson, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 183 days.

(21) Appl. No.: 16/010,906

(22) Filed: Jun. 18, 2018

(65) Prior Publication Data
US 2019/0384072 A1 Dec. 19, 2019

(51) Int. Cl.
G02C 7/00 (2006.01)
G02C 5/00 (2006.01)
G02C 3/00 (2006.01)
G02C 13/00 (2006.01)
G02C 7/04 (2006.01)

(52) U.S. Cl.
CPC .............. *G02C 7/049* (2013.01); *G02C 7/041* (2013.01); *G02C 7/047* (2013.01); *G02C 7/048* (2013.01)

(58) Field of Classification Search
CPC ... G02C 7/04; G02C 7/02; G02C 5/00; G02C 7/06; G02C 7/061; G02C 7/024; G02C 7/028; G02C 7/048; B29D 11/00826
USPC ...... 351/159.01–159.03, 41, 159.05–159.06, 351/159.12, 159.14, 159.16, 159.4, 351/159.41, 178, 159.73–159.77
See application file for complete search history.

(56) References Cited

U.S. PATENT DOCUMENTS

| | | | |
|---|---|---|---|
| 5,760,870 A | 6/1998 | Payor et al. | |
| 6,406,145 B1 | 6/2002 | Jubin | |
| 6,491,392 B2 | 12/2002 | Roffman et al. | |
| 6,939,005 B2 | 9/2005 | Jubin et al. | |
| 7,159,979 B2 | 1/2007 | Jubin et al. | |
| 7,201,480 B2 | 4/2007 | Neadle et al. | |
| 7,682,019 B2 | 3/2010 | Neadle et al. | |
| 8,668,331 B2 | 3/2014 | Gerligand et al. | |
| 8,827,448 B2 | 9/2014 | Liang | |
| 9,778,487 B2 | 10/2017 | Gerligand et al. | |
| 2003/0109926 A1* | 6/2003 | Portney | A61F 2/1602 623/6.37 |
| 2014/0063444 A1 | 3/2014 | Wildsmith et al. | |
| 2017/0059882 A1* | 3/2017 | Gerligand | G02C 7/049 |

* cited by examiner

*Primary Examiner* — Dawayne Pinkney

(57) ABSTRACT

The invention provides an improved rotationally stabilized contact lens design and method of designing such a lens which minimizes stabilization time of the lens while maximizing the lens on-eye comfort. The lens and the method of designing the lens further improves upon an earlier method which utilizes and combines non-circularity and thickness differential aspects which results in equivalent or minimized stabilization time, ease of insertion and manufacturability as well as maximum comfort that is improved over that of what either aspect can achieve independently. This further improvement of stiffness profile is achieved by optimizing and selectively addressing thickness differential both diametrically and circumferentially in a non-round lens design.

18 Claims, 23 Drawing Sheets

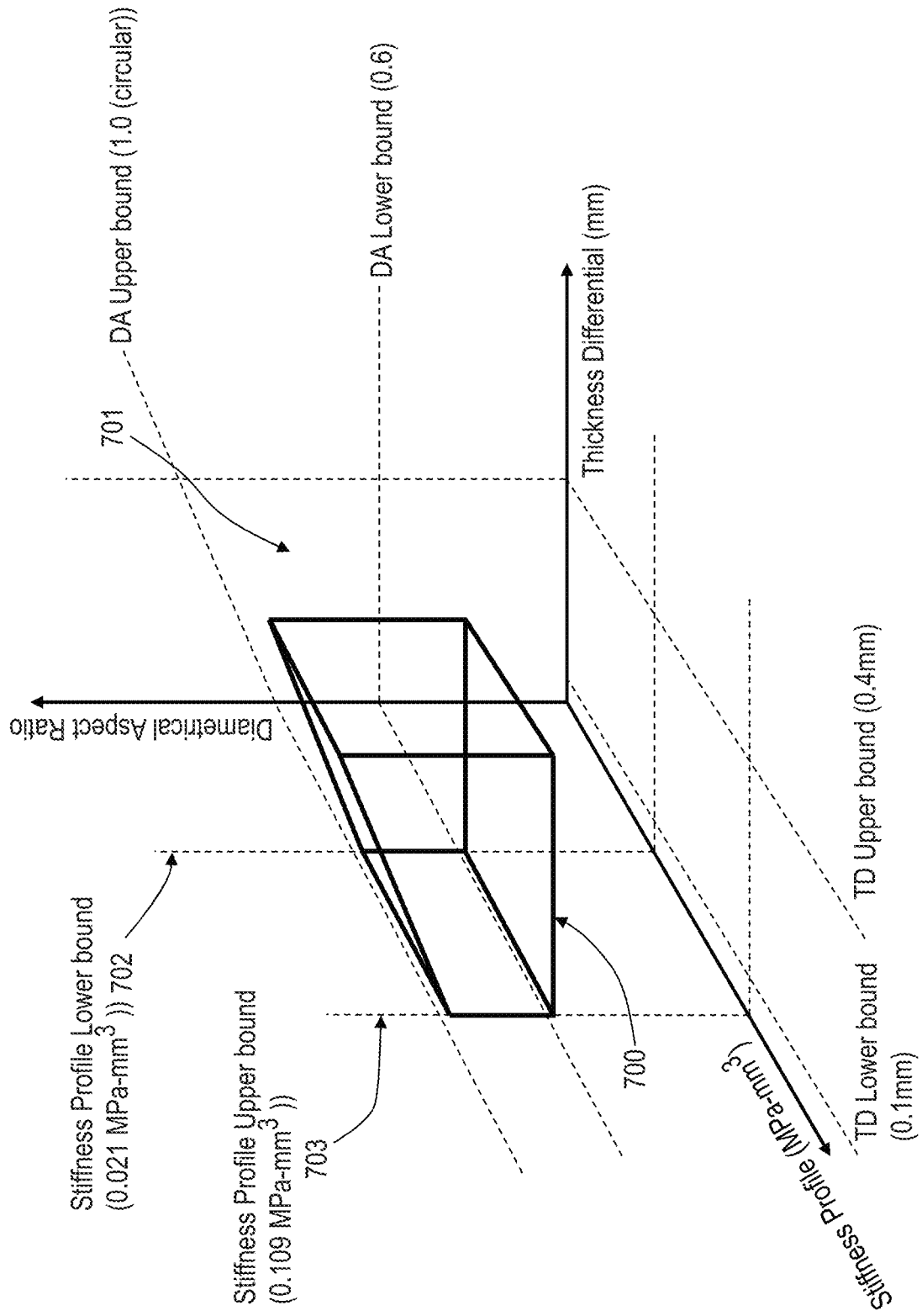

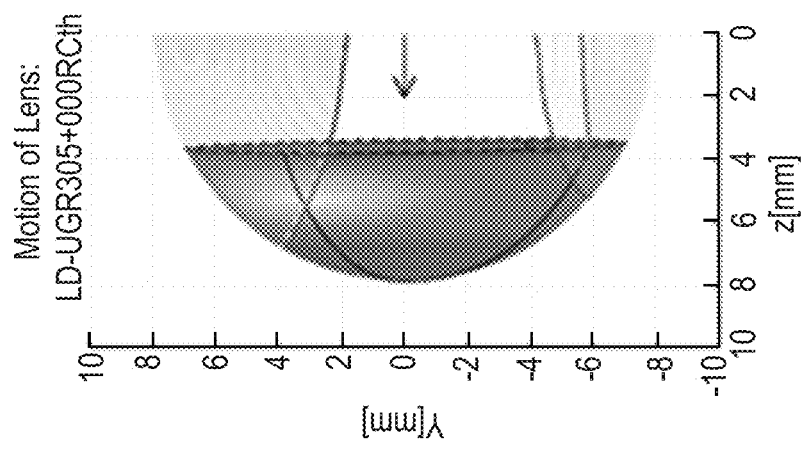
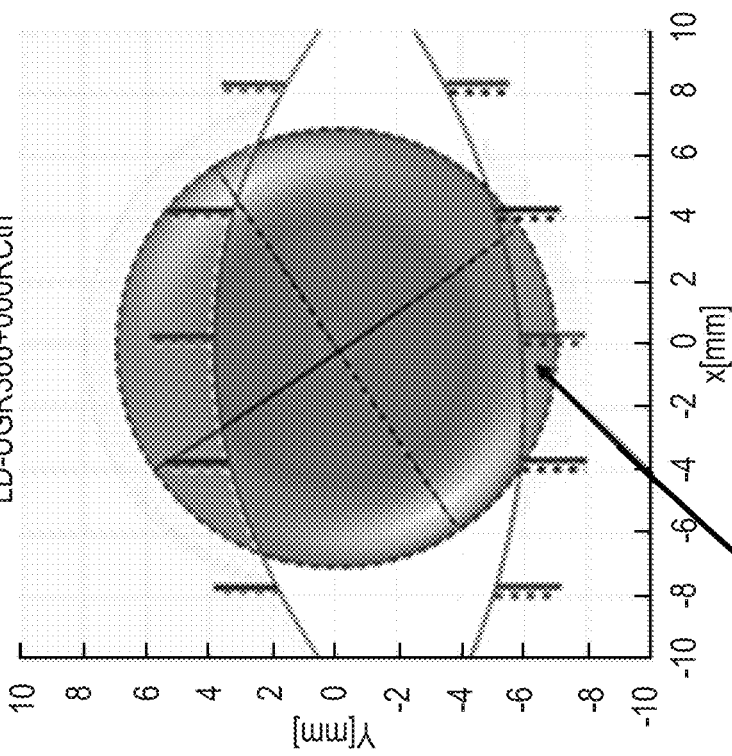

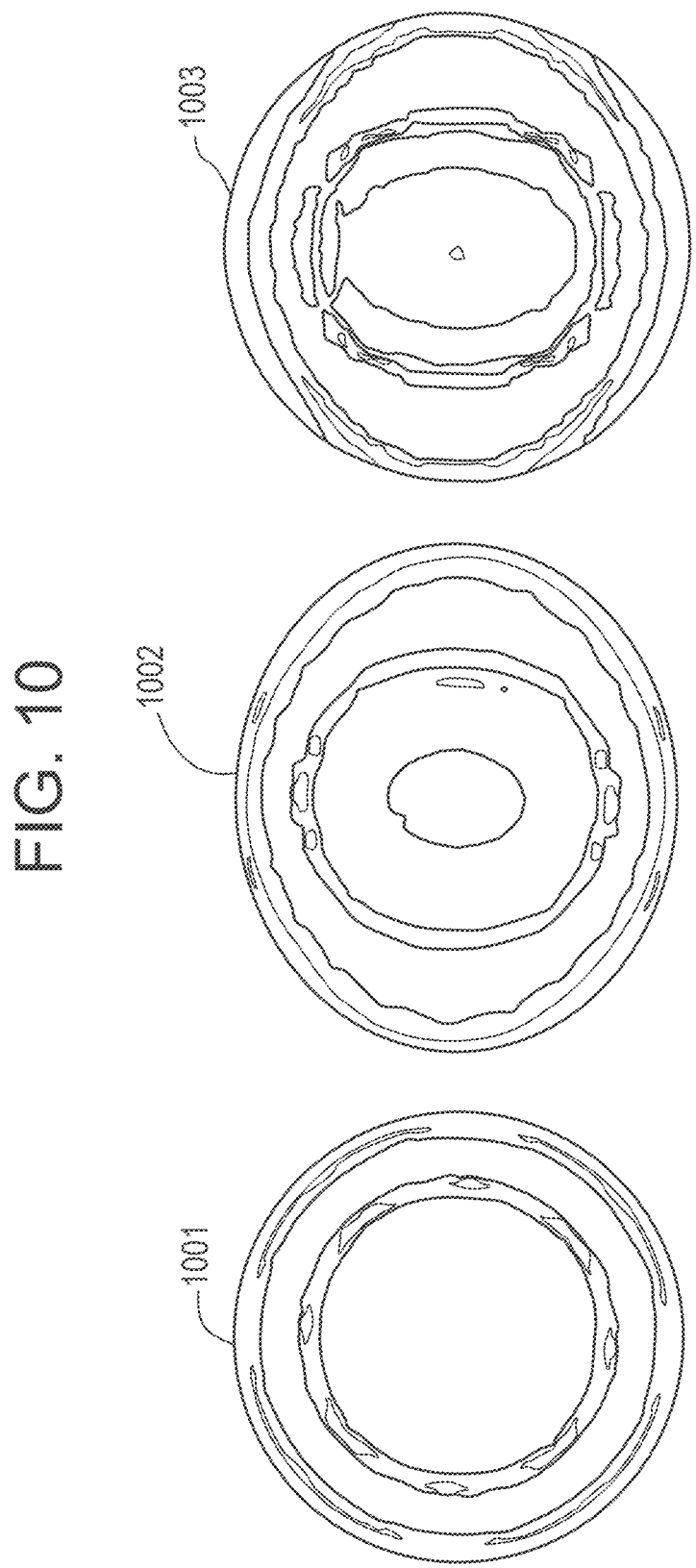

Stiffness vs. radial location

Stiffness vs. radial location

Stiffness vs. radial location - Effective Area determination

Lens re-orientation (design ID: UGR303)

Lens re-orientation (design ID: ORB365)

ROTATIONALLY STABILIZED CONTACT LENS WITH IMPROVED COMFORT AND IMPROVED STABILIZATION UTILIZING OPTIMIZED STIFFNESS PROFILES

BACKGROUND OF THE INVENTION

1. Field of the Invention

The present invention relates to ophthalmic lenses, and more particularly to contact lenses which are rotationally stabilized. Specifically, the present invention relates to designs and methods which optimize lens geometry and utilize rotational recovery and comfort modeling to ensure acceptable rotational stabilization in the lens while also achieving improved comfort on eye.

2. Discussion of the Related Art

Contact lenses are considered medical devices and may be worn to correct vision and/or for cosmetic or other therapeutic reasons. Contact lenses have been utilized commercially to improve vision since the 1950s. Early contact lenses were made or fabricated from hard materials, and were relatively expensive and fragile. Although these contact lenses are still utilized today, they are not suitable for all patients due to their poor initial comfort. Later developments in the field gave rise to soft contact lenses, based upon hydrogels, which are extremely popular and widely utilized today. The introduction of soft contact lenses has significantly improved the comfort experienced by the wearer. One type of contact lens is a spherical contact lens, which for the most part provides a uniform power, and since these lenses are substantially spherical they are rotationally symmetric so rotational placement or positioning on the eye is not a major concern. For those patients who require an astigmatic correction, one can provide a cylinder optical power correction in addition to the spherical power correction to achieve vision correction. These lenses, sometimes referred to as toric lenses, require the optical design to be rotationally stabilized in the correct orientation while worn on eye. In the astigmatic patient, relative rotational orientation of the lens is important to correct one's vision.

Astigmatism is caused by a non-rotationally symmetric curvature of the cornea and/or the crystalline lens. A normal cornea is substantially rotationally symmetric, whereas in an individual with astigmatism this is not the case. In other words, the cornea of the eye is more curved or steeper in one direction than another, thereby causing an image to be stretched out into a line of focus rather than focused to a single point. Toric rather than spherical/single vision lenses can be used to address this. A toric lens is an optical element having two different powers in two orientations that are perpendicular to one another. Essentially, a toric lens has one power, spherical for correcting myopia or hyperopia, and one power, cylinder, at a particular axis, for correcting astigmatism, both powers built into a single lens. These powers are created with curvatures oriented at different angles which are preferably maintained relative to the eye. The proper rotational orientation of the toric lens is thus essential to properly correct for astigmatism. However, with use, toric contact lenses may tend to rotate on the eye thereby temporarily providing sub-optimal vision correction. Accordingly, currently utilized toric contact lenses also include a mechanism to keep the contact lens relatively stable and in the proper orientation on the eye when the wearer blinks or looks around in order to maintain the correct vision correction. This mechanism also serves to return the lens to the stable and proper orientation on eye after insertion or when the lens moves out of the proper position and orientation. To ensure the proper orientation of the lens, various methods of lens stabilization have been utilized in the art such as ballast or preferential thick and thin zones. While there are various ways to achieve stabilization, all ways ultimately will be affected to varying degrees, by the interaction of the posterior surface of the contact lens with that of the anterior surface of the eye, and the eyelids as well, particularly in the peripheral regions, which may also negatively impact vision and subjective wearer comfort.

The challenge with currently designed or utilized stabilization zones is a tradeoff between contact lens stability and comfort, as well as the physical limitations associated with increased thickness of the lens in the regions of the stabilization zones. Changes to the design to improve rotational speed, such as increasing the surface slope of the stabilization zone, also increases contact lens thickness and may adversely impact comfort. Additionally, the contact lens design must accomplish two things; namely, to rotate to the proper orientation on insertion, and to maintain that orientation through the wear period. Conventional designs require tradeoffs in performance between these multiple considerations. While much of today's conventional lenses are circular in shape, employing non-circular geometries may in some cases provide an additional flexibility to ensure the balance between stabilization and comfort are optimized and further improved.

In U.S. Pat. No. 6,406,145, rotationally stabilized contact lenses with minimal thickness changes are disclosed. In U.S. Pat. No. 6,491,392 the design of the stabilization features incorporates the use of spline or polynomial functions to improve comfort, while U.S. Pat. Nos. 6,939,005 and 7,159,979 both focus on the rate of change of the thickness differential to reduce the time to stabilize the lens. U.S. Pat. Nos. 7,201,480 and 7,682,019 employ the use of thin zones for stabilization purposes.

In more recent attempts to address the needs of the astigmatic patient, for example, U.S. Pat. No. 8,827,448 proposes the use of astigmatism-free customized lenses for refractive correction with a first cylindrical power on the anterior surface and a second cylindrical power on the posterior surface of the contact lens. While it is suggested that improved visual acuity is achieved with such a design, these items are limited to the optical zone of the lens and how that interacts with an asymmetrically shaped cornea. Design changes in other regions, most notably the peripheral region of the lens, can still have an impact and would not adversely impact those limited to the optical zone seeking to improve visual acuity and thus coexist and further improve lens performance.

Early use of non-round lenses for stabilization purposes is disclosed in U.S. Pat. No. 5,760,870, primarily to avoid thickening the lens for stabilization purposes. The inventors of the '870 patent indicated that lens thickening resulted in patient discomfort, undesirable power variations, and reduced oxygen permeability in the thickened regions, advocating the use of a non-round lens instead and the resulting difference in the aspect ratio of the lens to achieve stabilization rather than thickness differential. More recently, in U.S. Pat. No. 8,668,331 the use of a non-round lens to maximize the lens-lid interaction for the purposes of centration, rotation, and stabilization is disclosed and can be instructive. In US Published Patent Application No. US20140063444, assigned to the same assignee as the assignee of present invention, the use of round and non-round shapes along with stabilization zones is disclosed; however, optimizing the shape and thickness in combination is not discussed. Lens Interaction with the corneal surface, particularly at the location of the limbus can result in entrapped bubbles behind the lens, this situation can be more prevalent with larger diameter lenses as the diameter of the lenses typically extend beyond the location of the limbus. U.S. Pat. No. 9,778,487, assigned to the same assignee as the present invention is particularly relevant art, and describes a methodology which utilizes and combines non-circularity and thickness differential to optimize lens design.

In summary, most of the previous innovators in this space have attempted to address this issue of stabilization by selective lens thickening, lens thinning, prism ballast, and other methods all of which can be generally characterized as thickness differential designs. A limited number have looked for a solution using non-round lenses, which may be generally characterized as the circularity/non-circularity designs, which in some cases attempted to mask the astigmatism altogether. Furthermore, despite significant improvements in both lens design and materials, many contact lens wearers still drop-out for reasons related to discomfort. Applicant believes very few have looked holistically to address lens design using a suite of modeling tools, even less who have been successful. Applicant believes use of tools such as these can provide insight into how a lens design interacts with the corneal surface it sits upon, and how geometric lens parameters can be optimized to achieve rotational stabilization with improved comfort.

Accordingly, there exists a need for contact lenses to further improve upon rotational stability achieved by simultaneously optimizing non-circularity and thickness differential to achieve improved on eye performance while maintaining a high degree of comfort and vision correction. A second objective would be removal of, or prevention of, bubbles entrapped behind larger diameter lenses. Particularly lenses with stabilizing features and diameters that result in the lens extending beyond the limbal region are more prone to bubbles being entrapped behind the lens.

SUMMARY OF THE INVENTION

The contact lens in accordance with the present invention overcomes the disadvantages associated with the prior art as briefly described above by providing a non-circular lens design with an optimized design that prevents central buckling of the lens, minimizes lifting over the limbus (the region where the cornea meets the sclera) to prevent bubble formation, provides an even distribution of contact stress, and is easily and properly orientated while also achieving satisfactory or improved comfort. Specifically, by using the entire lens shape and optimizing the reshaping of the stabilization zones based upon feedback from predictive eye models, one can achieve results not obtainable with those achieved using more conventional approaches.

Applicant has further improved upon the discovery that there exists a preferred relationship between the shape of the rim of the lens (non-circularity or diametrical aspect ratio) and the amount of thickness differential employed. See U.S. Pat. No. 9,778,487, commonly owned by applicant, and hereby incorporated by reference. While the approach of the '487 patent resulted in a lens which was optimized for stabilized orientation, comfort and handling, and thereby enabling improved performance results not obtainable with either approach of non-circularity or thickness differential alone, applicants present invention adds the additional aspect of stiffness profile to realize additional improvements in comfort of the lens while on eye, while still providing equivalent rotational recovery of the lens and reducing occurrence and size of bubble formation under the lens.

As disclosed in U.S. Pat. No. 9,778,487 both non-circularity and thickness differential can be leveraged to optimize lens design. In the present invention, applicants have further improved upon this methodology and resulting lens design by incorporating an additional aspect; namely, stiffness profile to that of the methodology employed in U.S. Pat. No. 9,778,487. In accordance with the present invention this is achieved by the judicious placement of material both diametrically and circumferentially which allows for similar rotational recovery of typical state of the art stabilized lens designs, but with the added benefit of significantly reduced thickness differentials. We refer to this as the stiffness profile. If both non-circularity and thickness differential represents the first two dimensions of design freedom for which a second order optimal design can be achieved by analyzing the choices of non-circularity in combination with a specified thickness differential, applicants have determined that the addition of a third design dimension, in accordance with the present invention, which represents stiffness profile, can provide additional design flexibility and design options to achieve an optimized design in each of the three dimensions of the design space which further improves upon the optimal design that existed in the two dimensional design space of U.S. Pat. No. 9,778,487 owned by applicant.

Stiffness is a function of both material modulus and thickness. One may calculate the stiffness as E multiplied by t cubed, where E is the elastic modulus and t is the normal thickness at a given point (bending stiffness). Others have defined stiffness as E multiplied by t (extensional stiffness). In the present invention, applicants have chosen to use the stiffness profile, defined as E multiplied by t squared, which while not exactly stiffness in the strictest sense, is indeed proportional to stiffness.

In accordance with one aspect, the present invention is directed to a method for optimizing the stabilization of a contact lens on eye while maximizing comfort. This method includes several steps, the first being defining a matrixed set of peripheral geometries having a non-circularity component and a thickness differential wherein the non-circularity component ranges from 95% to 60% from a true circle and the thickness differential ranges from 0.1 mm to 0.4 mm wherein the matrixed set includes a minimum of two non-circularity values and a minimum of two thickness differential values. This is then followed by calculating the time to stabilize for each item in the matrixed set for a given non-circularity component and a given thickness differential; and then creating a contour plot showing the time to stabilize for each item in the matrixed set. One would then assess the contour plot and define the preferred region based upon at least one of three variables of maximizing comfort, minimizing time to stabilize, or minimizing manufacturing difficulty, and then ultimately select the peripheral geometry having both a non-circularity component and having a thickness differential which produces an optimal stabilization time within the confines of the preferred region. If the resulting peripheral geometry with its non-circularity component (i.e.: diametrical aspect ratio) and thickness differential requires further optimization, the process can be repeated until the resulting combinations achieve the conditions desired.

In accordance with another aspect, the present invention is directed to a contact lens having an inner optic zone for correcting vision, and outer zone configured for providing rotational stability wherein rotational stability is achieved by the combination of non-circularity or what we call decreasing diametrical aspect ratio and a thickness differential component. The non-circularity or decreasing diametrical aspect ratio may be described by a pair of effective dimensions proportionally related and defined with inscribed and circumscribed circles as well as the positioning of the centers of these circles to create a family of non-circular shapes. The diametrical aspect ratio or extent of non-circularity is preferably between 0.6 and 0.95. The thickness differential component may be defined by the difference between the maximum and minimum thickness of the lens this difference preferably being between 0.1 mm and 0.4 mm. Peripheral zones can be both symmetric and asymmetric. The centers of the circumscribed and inscribed circles which define the effective dimensions of the lens shape may be coincident or non-coincident and may lie on the same or different vertical or horizontal meridians.

In accordance with yet another aspect, the present invention is directed to a contact lens further comprising a third-order design principle leveraging the stiffness profile of the contact lens. In addition to non-circularity and thickness differential, stiffness profile, (or alternatively the judicious placement of the material of the lens), is utilized to achieve the optimal balance between a propensity of the geometry to drive rotational stability and the resulting on-eye comfort of the lens. This allows one to both maximize performance and to further improve lens comfort while on eye. Specifically, and in accordance with the present invention, applicants have determined that for a given non-circularity and thickness differential, the thickness differential can be further reduced up to approximately 50% with the range of 30 to 50% being preferred, by the judicious placement of material while still ensuring adequate rotational recovery. This reduction results in improved comfort of the lens on eye and reduction in bubble formation. Applicants have determined that reductions below 30% have no significant impact on reduction of bubble formation, while values greater than 50% are not adequate to ensure rotational recovery.

In accordance with yet another aspect, the present invention is directed to a method which further improves the extent of maximum comfort while still achieving the optimization of the stabilization of a contact lens on eye. This method includes several steps, the first being defining a matrixed set of peripheral geometries having a non-circularity component and a thickness differential wherein the non-circularity component ranges from 95% to 60% from a true circle and the thickness differential ranges from 0.1 mm to 0.4 mm wherein the matrixed set includes a minimum of two non-circularity values and a minimum of two thickness differential values. The use of multiple analytical tools to define the optimal stiffness profile coupled with non-circularity and optimal and further reduced thickness differential resulting in an optimized design in each of the three dimensions of the design space which allows for the additional improvement to comfort. This is then followed by calculating the time to stabilize for each item in the matrixed set for a given non-circularity component, a given thickness differential, and optimized stiffness profile; and then creating a contour plot showing the time to stabilize for each item in the matrixed set. One would then assess the contour plot and define the preferred region based upon at least one of three variables of maximizing comfort, minimizing time to stabilize, or minimizing manufacturing difficulty, and then ultimately selecting the peripheral geometry having a non-circularity component, a thickness differential and a stiffness profile which produces an optimal stabilization time within the confines of the preferred design volume space. If the resulting peripheral geometry with its non-circularity component (i.e.: diametrical aspect ratio), thickness differential and stiffness profile requires further optimization, the process can be repeated by changing the initial lens design parameters until the resulting combinations achieve the conditions desired.

Optimization of stabilization may be measured by assessing how quickly a lens stabilizes to its desired rotational position. Lens comfort on the other hand, is somewhat more subjective, but nevertheless may be predicted by analytical methods and confirmed by clinical studies. While both non-circularity and thickness differential independently may achieve, in different ways, a reduction in stabilization times, the combination of the two can not only improve stabilization time more effectively than either item alone, but in a more comfortable fashion in accordance with the present invention. The use of a stiffness profile further improves the level of comfort obtainable while not sacrificing stabilization time. While reductions in thickness differential may improve comfort, this also negatively impacts stabilization efficacy. Increases in non-circularity may improve stabilization efficacy but at the expense of comfort, increased manufacturing difficulty and costs as well as increased handling difficulties. Optimal stiffness profile allows for the optimal placement of thickness in the lens both radially and circumferentially to ensure only the minimum level of thickness required to achieve stabilization is being utilized thus further improving comfort.

In accordance with the present invention, one object is to provide a method of how one can employ these multiple approaches to yield an optimized design that performs better than one using either single approach alone. Another object is the resulting lens design when this approach is employed. Yet another object is to improve upon existing designs using the methodology disclosed in accordance with the present invention. The contact lenses of the present invention may be utilized with any type of contact lens optics without additional cost and optimized to improve clinical comfort and/or physiology. Additionally, combination products such as contact lenses combined with therapeutic agents, and beauty lenses that have cosmetic patterns can also leverage the benefits of the present invention.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 7 shows an example of the addition of Effective area/Stiffness profile as an additional design dimension for an optimized design in each of the three dimensions of the design space and the resulting design space defined by the three design dimensions of various diametrical aspect ratios (non-circularity), various thickness differentials and stiffness profiles.

FIGS. 8A through 8C provide a somewhat typical output of the Rotation/Centration Model showing how a representative design would behave.

FIG. 9B is the detail view of FIG. 9A, FIG. 9D is the detail view of FIG. 9C, and FIG. 9F is the detail view of FIG. 9E.

FIG. 10 provides a typical output from applicants Virtual Wrapping model showing the results of three different design configurations and the impact each has upon the uniform or non-uniform distribution of contact stress within the lens when it interacts with the corneal/ocular surface of the eye.

DETAILED DESCRIPTION OF THE PREFERRED EMBODIMENTS

Figure 1A:
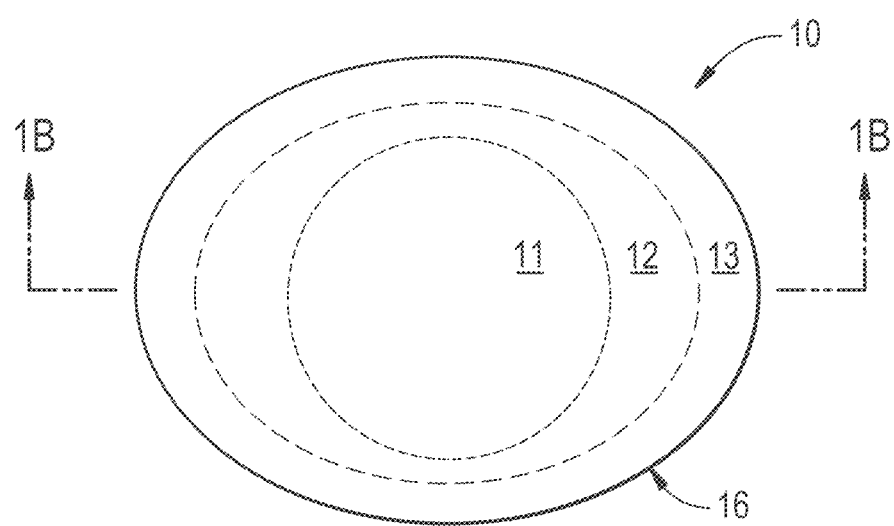
FIG. 1A provides a representative drawing of the lens and its regions looking through the noncircular lens itself in accordance with the present invention.

For purposes of the present invention a contact lens 10 as shown in FIG. 1A is defined by at least two distinct regions. The inner region 11 from which the vision correction is obtained and the outer peripheral region 13 of the contact lens 10 that provides mechanical stability of the contact lens 10 on eye. A third optional intermediate region 12 located between the inner region 11 and the outer region 13 can be utilized for blending the two aforementioned regions in a smooth manner such that abrupt discontinuities do not occur. In some exemplary embodiments the intermediate region 12, may not be required.

The inner region 11 or optical zone, provides vision correction and is designed for a specific need such as single vision correction, astigmatism vision correction, bi-focal vision correction, multi-focal vision correction, custom correction or any other design that may provide vision correction. The outer periphery or peripheral zone 13 provides for basic fit and stabilization of the contact lens on the eye including, centration and orientation. Rotational stabilization is fundamental when the optical zone includes non-rotationally symmetric features, such as astigmatic correction and/or higher order aberration correction. The optional intermediate region or zone 12 ensures that the optical zone and the peripheral zone are blended smoothly. It is important to note that both the optical zone 11 and the peripheral zone 13 may be designed independently, though sometimes the designs of each are strongly related when interactions are present. For example, the design of a toric lens with an astigmatic optical zone might require a particular peripheral zone for maintaining the contact lens at a predetermined orientation on the eye.

Figure 1B:
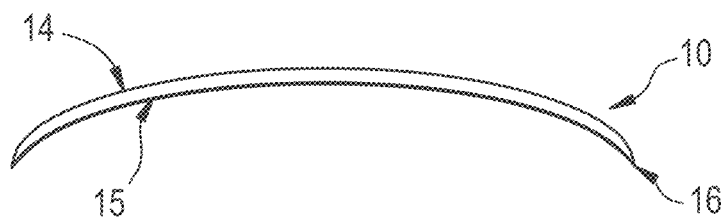
FIG. 1B provides a cross-sectional representation of the noncircular lens shown in FIG. 1A in accordance with the present invention.

For purposes of the present invention a contact lens is also defined by a front surface 14, a back surface or base curve 15 and an edge 16 as shown in FIG. 1B which is a cross section of the lens of FIG. 1A. The front and back surface of the contact lens is described by at least two regions, the inner region 11 from which the vision correction is obtained and the outer region 13 or periphery of the contact lens that provides mechanical stability of the contact lens on eye. As stated previously an optional intermediate region 12 located between the inner region 11 and the outer region 13 may be used for joining and/or blending the two aforementioned regions in a continuous and/or smooth manner such that discontinuities do not occur as described above. In certain situations, with noncircular designs, the intermediate region 12 allows one to easily transition from a circular optical zone to the noncircular periphery while avoiding discontinuities, and making smoother thickness changes along the radial dimension of the lens 10.

Lens thickness is an important variable which is optimizable and may be determined in any of the three regions, but preferably in the outer or peripheral region 13 by simply measuring the relative distance along a direction perpendicular to the base curve between the front surface 14 and back surface 15. The thickness differential is defined as the difference between the nominal thick portions of the lens and the nominal thin portions of the lens. The nominal thick portion represents the maximum peripheral thickness of the lens. The nominal thin portion of the lens lies along the meridian of minimum peripheral thickness, but is specified as the thickness at a proportionally equivalent radial distance to that of the maximum thickness of the lens. This is an important variable for the purposes of both stabilization efficacy as well as comfort. In general, the larger the thickness differential the more effective the stabilization effect, unfortunately the larger thickness differentials also tend to be more noticeable to the wearer and may result in more discomfort particularly for highly sensitive lens wearers. In accordance with the present invention, one can calculate the effect of using a reduction, or percentage, of a given thickness differential and calculate the effect of this reduction or percentage has on the time it takes for a given lens design to stabilize as well as the impact to comfort. One can also target a desired thickness differential directly. Our studies and experiences to date have shown thickness differentials in the range of 0.1 mm to 0.4 mm are more preferred for improved comfort while still achieving effective stabilization in accordance with the present invention.

Figure 2A:
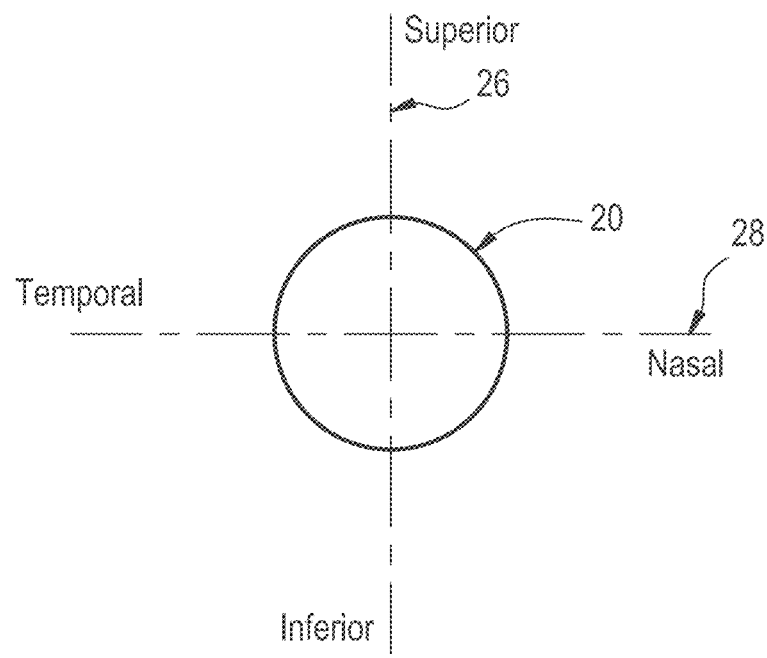
FIGS. 2A through 2E provide a schematic representation of various circular (conventional) and non-circular lens shapes and how the degree of non-circularity or diametrical aspect ratio is defined in accordance with the present invention.
Figure 2B:
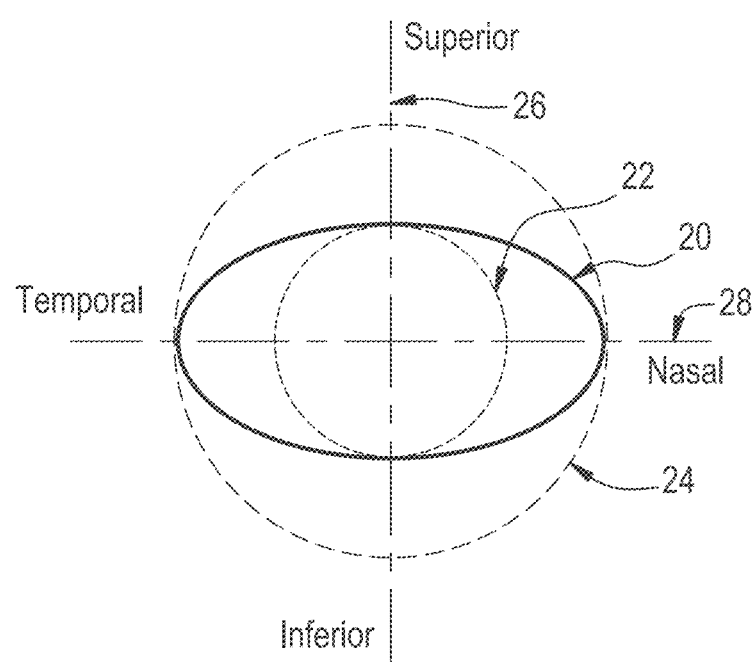

The edge 16 is the rim of the contact lens 10, and is another useful variable to consider in an optimization scheme. For the present invention, the shape of the edge 16 is preferred to be non-circular and may be asymmetric as well. For present purposes circularity/non-circularity is defined as the ratio of the largest inscribed diameter that can fit within the peripheral shape of the lens divided by the smallest circumscribed diameter that fits around the peripheral shape of the lens. Thus, in a conventional circular contact lens, these two diameters would not only be equal, but the centers of both the inscribed and circumscribed diameters would be coincident. In accordance with the present invention, non-circularity may result in an oval lens. This occurs when the center of the largest inscribed diameter and the center of the smallest circumscribed diameter are coincident but the diameters of each are not equal as shown in FIG. 2B. Non-circularity or what we call diametrical aspect ratio may also include asymmetric lenses relative to either the horizontal meridian or the vertical meridian. This asymmetric lens type may occur when the centers of the inscribed and circumscribed diameters are aligned along the vertical or the horizontal meridians respectively but are not coincident. Lastly another non-circularity example in accordance with the present invention may include an asymmetric profile where the non-coincident centers are not aligned either horizontally or vertically.

When one looks at a reduction of a thickness differential alone for a circular lens (circular being defined as the diametrical aspect ratio being equal to 100%), the impact is that the time to stabilize increases with reducing percentages of the original thickness differential. When one evaluates increasing non-circularity or alternatively a decreasing diametrical aspect ratio, for a given starting thickness differential, one may see a slight reduction in time to stabilize, followed by no change, followed by an increase in time to stabilize. Thus, for a thickness differential of 95%, starting with a circular lens (diametrical aspect ratio being equal to 100%) as the diametrical aspect ratio decreases from 100%, the time to stabilize decreases reaching its minimum at approximately 85% diametrical aspect ratio, further decreases in the diametrical aspect ratio after the 85% level result in a reversal and stabilization times then increase with further decreases in diametrical aspect ratios. However, this trend and rate of change changes with differing thickness differentials. As one investigates the combination of increasing non-circularity or decreasing diametrical aspect ratio coupled with reducing the thickness differential simultaneously, as in the present invention, such that local regions of minimum time to stabilize can be determined, one can define an improved product over that achievable with non-circularity or thickness differential alone.

Figure 2C:
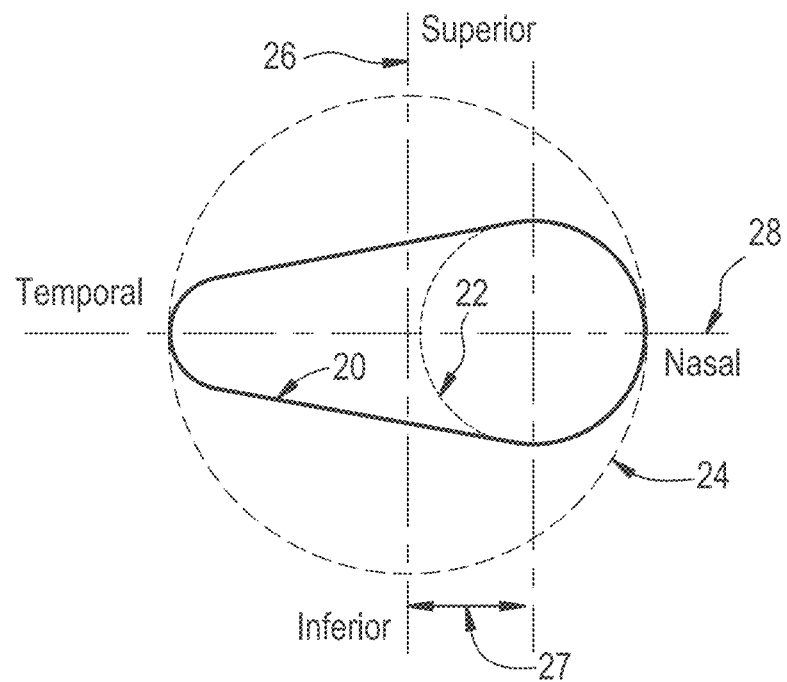
Figure 2D:
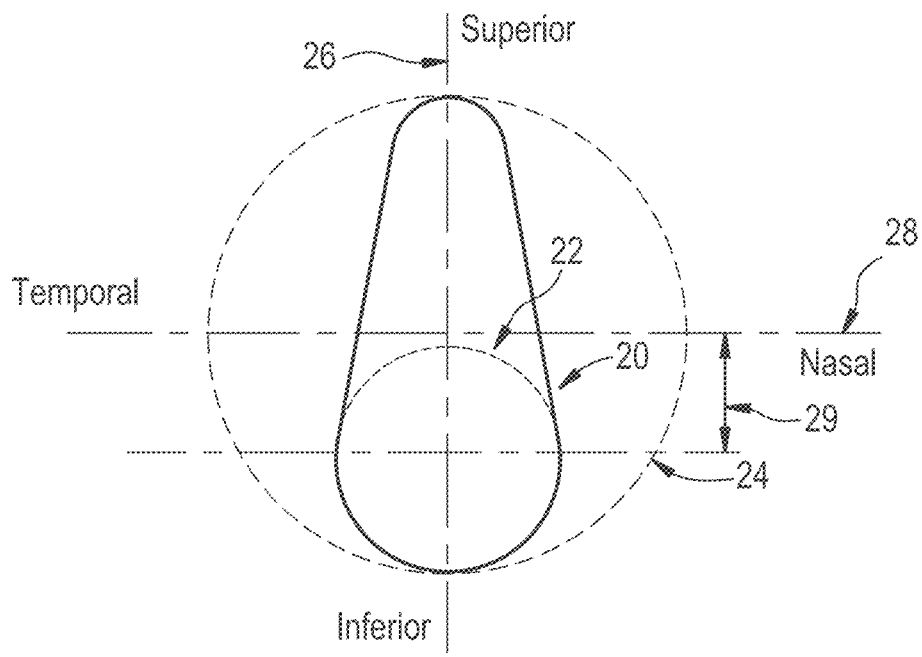
Figure 2E:
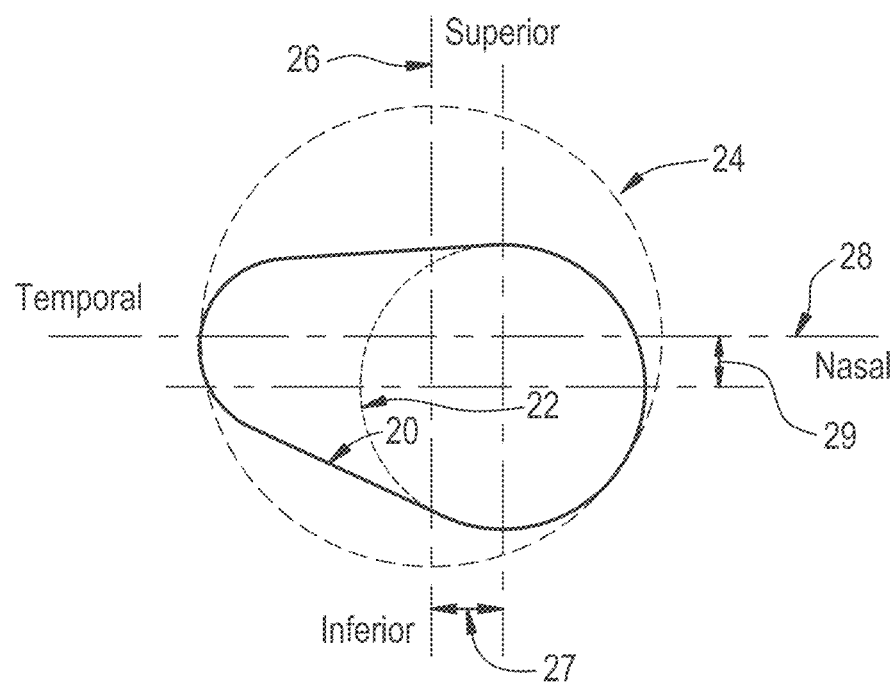

FIGS. 2A through 2E provide examples of five representative situations. In the first example, (see FIG. 2A) there is illustrated a conventional circular contact lens 20, wherein the inscribed and circumscribed circles (not shown) have equal diameters which equal the lens diameter. In addition, the centers of all three (inscribed, circumscribed and lens itself) are coincident, and positioned at the intersection of the Superior-Inferior axis 26, and the Nasal-Temporal axis 28. Thus, both circles and the positioning of the centers are no different than that of the peripheral margin of the lens 20. In the first non-circular example (see FIG. 2B) which is oval in shape, the inscribed circle 22 and circumscribed circle 24 have unequal diameters, but their centers are coincident. This results in a noncircular lens geometry 20, that is symmetric relative to both the Superior-Inferior axis (Vertical meridian) 26 and the Nasal-Temporal axis (horizontal meridian) 28. In FIG. 2C, the center of the inscribed circle 22 is displaced along the Nasal-Temporal axis (horizontal meridian) 28 by a distance 27, relative to the center of the circumscribed circle 24. This results in a temporal-nasal asymmetry while retaining the superior-inferior symmetry. In a similar fashion, in FIG. 2D, the center of the inscribed circle 22, is displaced along the Superior-Inferior axis (vertical meridian) 26 by a distance 29, relative to the center of the circumscribed circle 24. This results in a superior-inferior asymmetry while retaining the nasal-temporal symmetry. The last representative example in this series is shown in FIG. 2E, in which the inscribed circle 22 is displaced along both the Superior-Inferior axis 26, and the Nasal-Temporal axis, 28 relative to the circumscribed circle 24. This results in an asymmetric lens shape 20. As shown in FIGS. 2C through 2E, the extents of the horizontal offset 27 and the vertical offset 29 of the center position as well as the diameters of the inscribed 22, and circumscribed 24 circles, are not only related but may be changed and may be different to create a multitude of non-circular lens shapes beyond what is shown in the representative five examples.

Figure 3:
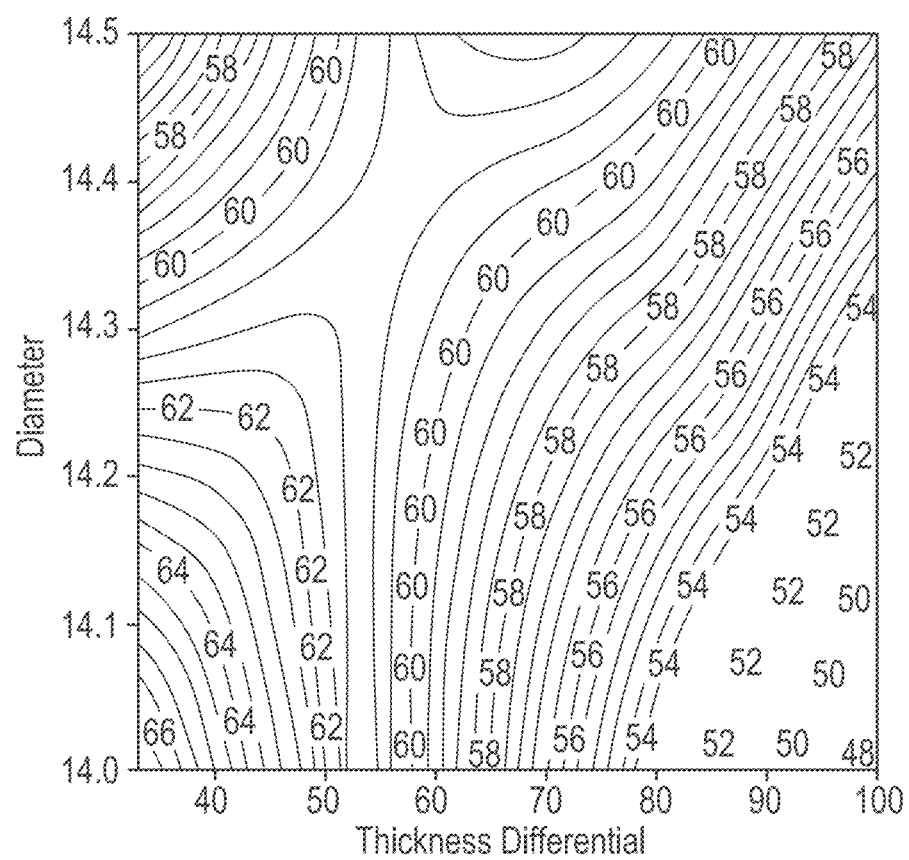
FIG. 3 provides a contour plot of clinical comfort readings for various conditions of both circular lens diameter and lens thickness differential whereas the higher values of clinical comfort scores represent more comfortable conditions.

FIG. 3 shows the comfort contour when one considers the relationship between thickness differential and multiple vertical dimensions/diameters of the circular lens. In this plot, comfort readings of 48 are less comfortable than comfort readings higher than 48. As one can see, the overall trend of decreasing thickness differential still improves comfort as one decreases thickness differential, but the rate at which the comfort improves is also diameter/dimension dependent. One can also see that for large thickness differentials, (>75%) as the circular diameter increases from 14.0 to 14.5, there is an increase in comfort for a given thickness differential that is above 75%. This is in contrast with smaller thickness differentials (<55%) where for a given thickness differential, as the circular diameter increases from 14.0 to 14.5, there is a decrease in comfort for a given thickness differential that is below 55%. In this example, the 14 mm dimension/diameter in combination with the smallest percentage thickness differential results in the highest level of comfort with a value of 66 or higher. While vertical diameters both larger and smaller than 14.00 mm diameters can be chosen, the following examples will focus on the 14.00 mm vertical diameter situation.

While the relationship between, and synergies achieved by leveraging both thickness differential and non-circularity are important, the effect of diameter needs to be considered as well. The subsequent examples we discuss will be for a 14.00 mm vertical diameter lenses with corresponding horizontal diameters based on the varying percentages of the Diametrical Aspect ratio. FIGS. 4A through 4D show the relationship of thickness differential and non-circularity that result in a preferred region 49 in accordance with the present invention. This region is one that maximizes comfort as well as other considerations such as stabilization time and ease of manufacturing. The contour plots shown in FIGS. 4A through 4D are based upon a lens having a consistent vertical dimension/diameter of 14.0 mm and contour bands or regions indicating the threshold times to stabilize scaled/normalized from greater than 90 to less than −50 seconds. Threshold time is defined as the time it takes for the lens to stabilize within 10 degrees of the final resting position in accordance with the theoretical prediction of the model. The normalization of the predicted times is relative to the time it takes for the stabilization of the starting design.

Figure 4A:
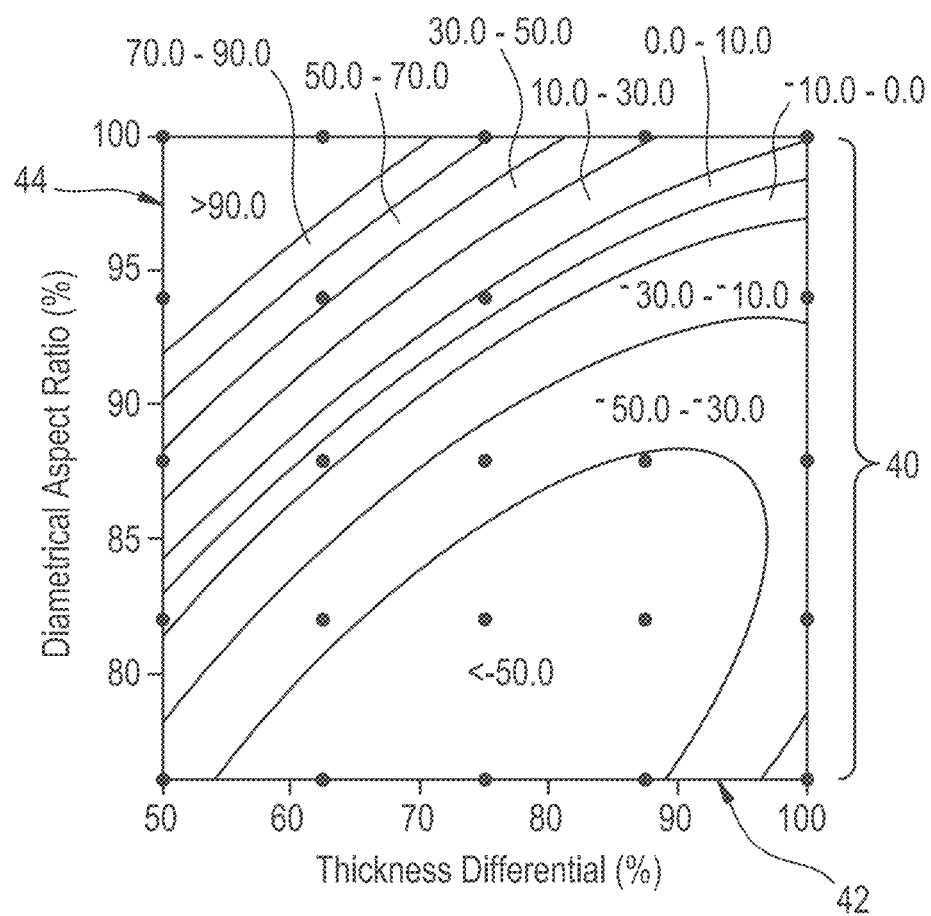
FIGS. 4A through 4D provide experimental contour plots of threshold time to stabilize for various diametrical aspect ratios (non-circularity) and various thickness differentials and how this information is leveraged to achieve the desired lens functionality for a given noncircular or diametrical aspect ratio and thickness differential in accordance with the present invention.

FIG. 4A shows a representative contour plot 40 of the threshold time for a 14.0 mm vertical diameter lens to stabilize. The corresponding horizontal diameters are obtained by dividing the 14.0 mm vertical diameter by the Diametrical Aspect ratio. Thus the 94% Diametrical Aspect ratio grouping would equate to a 14.89 mm horizontal diameter, while the 88% Diametrical Aspect ratio grouping would equate to a 15.91 mm horizontal diameter and so forth for the remaining Diametrical Aspect ratios. For each Diametrical Aspect ratio grouping with a constant horizontal diameter, respective thickness differentials were evaluated. This plot was constructed from a set of data points (shown as black dots on contour plot 40) for each diametrical aspect ratio and thickness differential combination indicated. Each data point is the average of the threshold times to stabilize on three eyes for the particular diametrical aspect ratio and thickness differential combination. The threshold times are normalized to the threshold time obtained for a given starting design (values less than 0 indicate faster stabilization time than starting design). This plot shows the impact of both thickness differential changes (horizontal axis) 42 as well as the impact of changing the diametrical aspect ratio or non-circularity changes of the lens periphery, (vertical axis) 44. As shown, this contour plot 40 is not monotonic and as such, this results in non-circularity and thickness differential combinations that are more desirable than others when both variables are considered simultaneously.

Figure 4B:
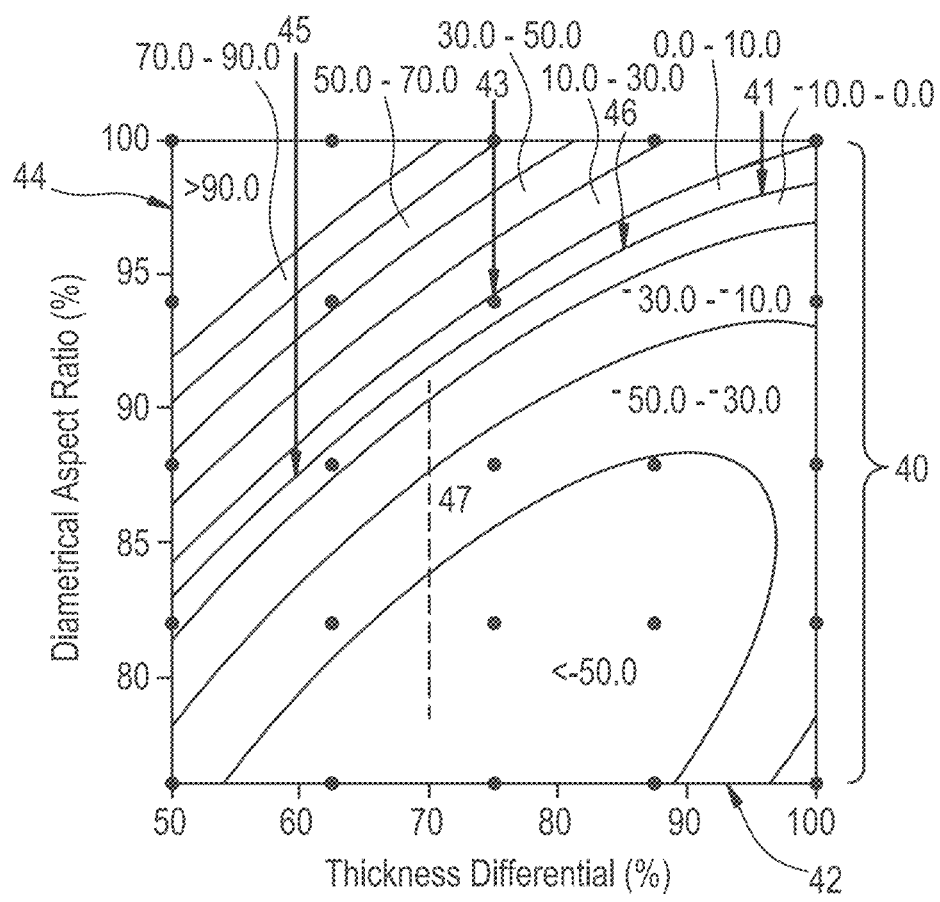

As FIG. 4B shows, depending which thickness differential reduction one is utilizing while increasing the extent of non-circularity or decreasing the diametrical aspect ratio, the resulting stabilization time response will be different depending on the combination chosen. As an example, three locations on a given path (contour line 46) are highlighted on contour plot 40, location path 41, corresponding to approximately a 97% thickness differential, location path 43, corresponding to approximately a 75% thickness differential, and location path 45 corresponding to approximately a 59% thickness differential. As one can see, the extent of non-circularity required is different for each particular location path to achieve the same level of stabilization time indicated by contour line 46. This particular contour line (noted as 46 in FIG. 4B) corresponds to the maximum stabilization time desired, as supported by clinical studies and is the dividing line between threshold times both greater and less than those times to stabilize of the starting design. While values below this contour line would be more acceptable for stabilization times, there are other considerations or trade-offs such as comfort and ease of manufacturing that need to be considered.

As stated previously while increasing the thickness differential generally decreases stabilization time, it may also decrease comfort. Clinical studies performed by applicant indicate a relationship of acceptable comfort to that of thickness differential. Based on these internal clinical studies, thickness differential reductions below 70% of the original thickness differential appear to provide more acceptable comfort as compared to those above 70%, as such we have determined that values to the left of a vertical boundary 47 at 70% thickness differential are preferred as shown in FIG. 4B in this example.

Figure 4C:
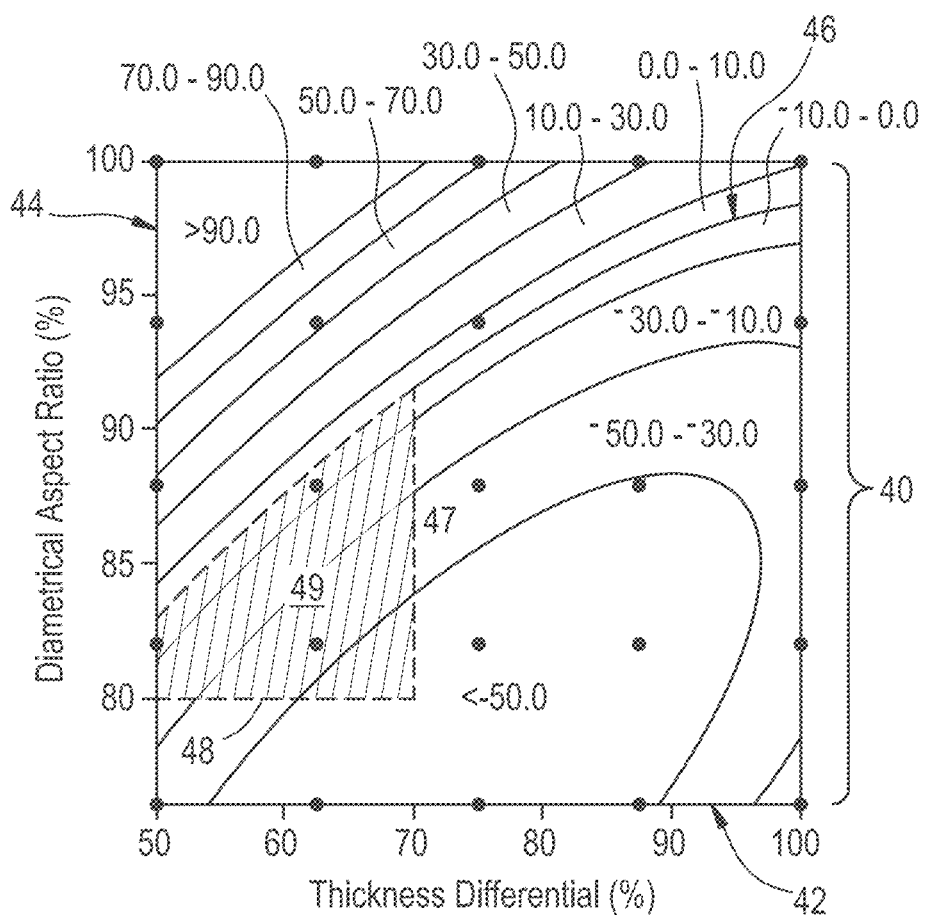

With respect to FIG. 4C, while the extent of non-circularity also contributes to accelerating time to stabilize, there are trade-offs here as well. As one departs from circular designs, with increasing non-circularity or decreasing diametrical aspect ratios, one introduces increasing manufacturing complexity as well as increased difficulty related to ease of handling once one goes beyond a certain level of non-circularity. As such, it has been determined that it is preferable to maintain the extent of non-circularity or the diametrical aspect ratio above 80%, represented on contour plot 40 as horizontal boundary 48 as shown in FIG. 4C. Thus, in accordance with the present invention, keeping to the left of vertical boundary 47, above horizontal floor 48, and below the corresponding portion of upper contour line band 46 one may define the preferred region 49 (shown shaded) which maximizes the inter-related considerations of: time to stabilize; wearer comfort; ease of insertion/handling; and manufacturability complexities to produce the optimal stabilization feature employing lens thickness differential and lens non-circularity which in this case is shown for the 14.00 mm vertical diameter lens in accordance with the present invention.

In a preferred aspect of the present invention, one may choose to further enhance the lens performance by focusing more on one consideration over that of another while remaining within the confines of the previously described preferred region 49. For example, if decreasing stabilization time was more important than the other considerations, one would create designs having non-circularity and thickness differentials that place one in the lower right-hand corner of the preferred region 49. If one was more focused on increasing comfort as the most important consideration, one would reduce the thickness differential, thus increasing comfort by choosing non-circularity and thickness differentials that place one in the left portion of the preferred region. Lastly, as it relates to design considerations, if one was more concerned with ease of insertion and/or manufacturability concerns, one would target the upper portion of the preferred region and produce lens designs that have a minimized extent of non-circularity and corresponding thickness differentials that fall within the preferred region.

Figure 4D:
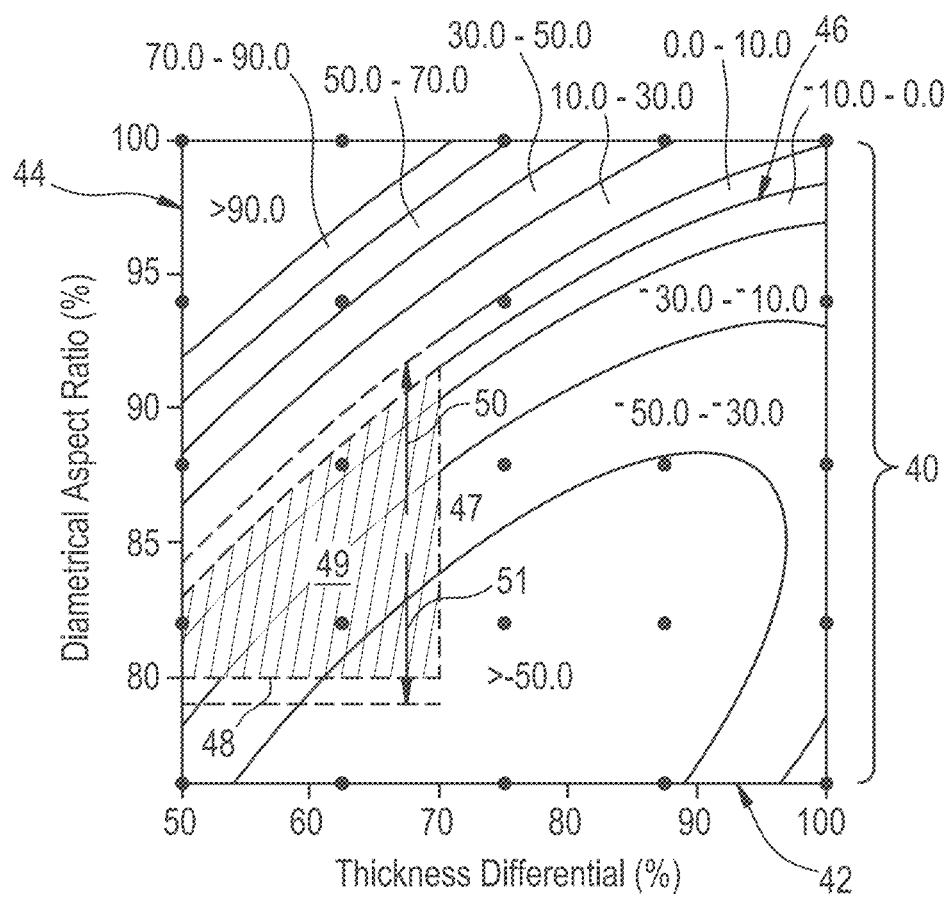

As stated previously the vertical diameter chosen for the set of non-circular and thickness differential combinations will produce a unique response surface. Increasing or decreasing the vertical diameter (and thereby a new set of non-circular and thickness differential combinations) will result in a change in this response surface and movement of the preferred region 49 primarily in the form of a vertical shift of the preferred region 49 as shown in FIG. 4D.

In accordance with an exemplary embodiment, it is believed an increase in vertical diameter will result in faster stabilization times thus resulting in a corresponding upward shift 50 of the preferred region. Accordingly, a decrease in the vertical diameter will increase stabilization times and produce a downward shift 51 of the preferred region.

While any initial starting design may be employed and further improved using the methodology described in accordance with the present invention, it is preferred to start with a known design as the starting point and improve its functionality by modifications to its non-circularity and introducing reductions in thickness differentials to achieve a more comfortable yet effectively stabilized design. Known designs may be works in process, previously commercialized designs, or former existing designs.

Figure 5:
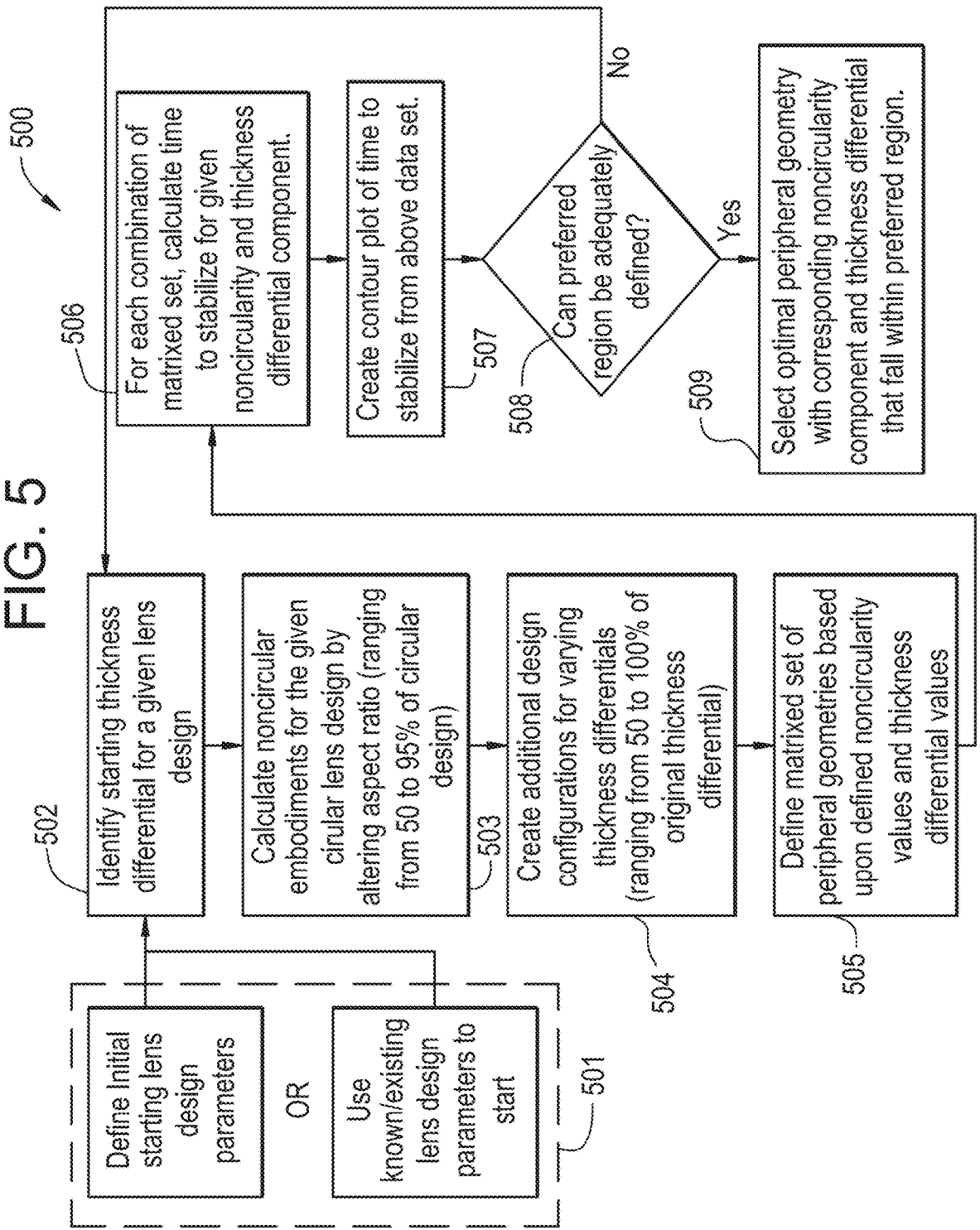
FIG. 5 shows a representative flow chart of the methodology employed for the $2^{nd}$ order optimization process in accordance with the present invention.

As shown in FIG. 5, the flow chart 500 begins with step 501, first defining the initial starting lens design parameters or using pre-defined lens design parameters of an existing design. For a given design, one first calculates the initial thickness differential, step 502. This will be the starting point as well as the maximum value of thickness differential and accordingly designated as the 100% thickness differential. For the given starting lens design (circular or noncircular), one can redesign the edge profile by altering aspect ratios to achieve increasingly more noncircular versions of starting lens geometry. Starting with a given vertical diameter dimension, one would use the diametrical aspect ratio to define the horizontal diameter dimension for each family of values from 50 to 95% of the circular design and preferably from 60 to 95% of the circular design, and most preferably from 80 to 95% of the circular design, step 503. This process is repeated for each thickness differential between 50% and 100% of starting value using adequate steps or increments of thickness differentials and for each diametrical aspect ratio option down to at most 50% non-circularity in adequate non-circularity increments, step 504. Once all permutations of diametrical aspect ratios and thickness differentials are defined, the stabilization time for each permutation is calculated, step 505; one can then populate the matrix with values and create the corresponding contour plot, step 506 and step 507. While each starting design will yield differing results for the stabilization time contour plot, for designs of same family one can expect similar shapes and trends, even if not identical. The next step is to identify the preferred region on the resulting contour plot: by identifying the vertical thickness differential boundary between 50 and 100% depending on level of comfort to be maximized; identifying the lower limit of non-circularity as the horizontal floor of the preferred region depending on the ease of handling and ease of manufacturability; and lastly identify the maximum resulting contour line for stabilization time that is equal to or less than that of the contour line for the stabilization time for the normalized starting design to ensure equivalent or if desired, improved stabilization to ultimately select the optimal geometry, steps 508 and 509. If one determines that the region is not adequate in step 508, one can than repeat the process for diameters greater or less than the starting diameters to ascertain if these alternative diameters further improve comfort, handling, and ease of manufacturing by returning to step 502. This process can be repeated in an iterative fashion to achieve the desired results.

Figure 6:
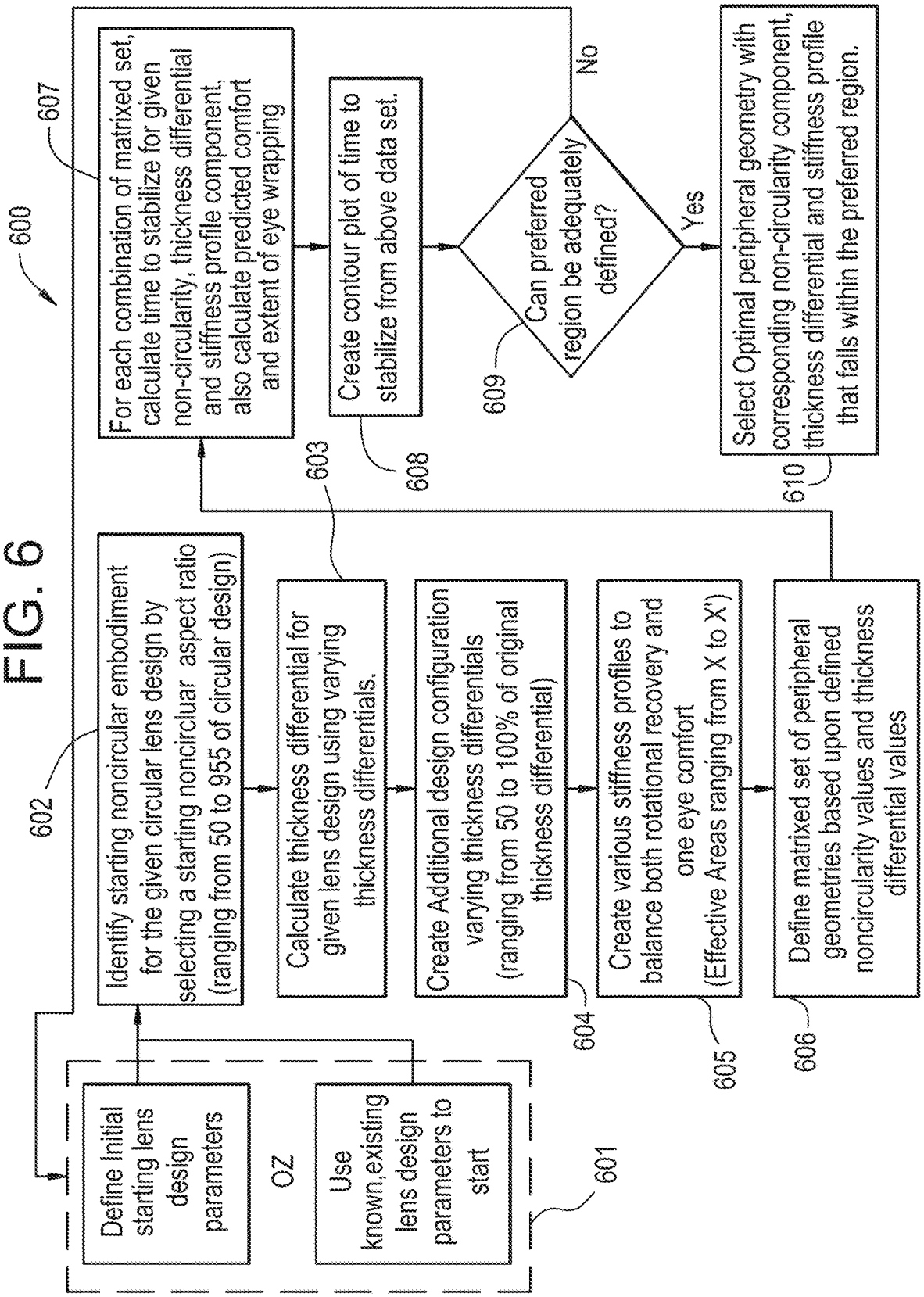
FIG. 6 shows a representative flow chart of the methodology employed for an optimized design in each of the three dimensions of the design space in accordance with the present invention.

With the addition of stiffness profile as an additional design dimension, a methodology for an optimized design in each of the three dimensions of the design space can be utilized which furthers improves that which can be achieved by optimizing only non-circularity and thickness differential in combination. As shown in FIG. 6, the steps are like those shown in the flow chart of FIG. 5, but the addition of step 605 now increases the level of design sophistication by adding the stiffness profile parameter as a $3^{rd}$ input, thus making the resulting lens of this methodology an optimized design in each of the three dimensions of the design space.

As shown in FIG. 6, the flow chart 600 begins with step 601, first defining the initial starting lens design parameters or using pre-defined lens design parameters of an existing design. Although the order of the parameter/component/design dimension to be optimized can be varied, it is preferable to start with the non-circularity/aspect ratio followed by the thickness differential and then the stiffness profile. Thus, one first selects the starting noncircular aspect ratio. For the given starting lens design (circular or noncircular), one can redesign the edge profile by altering aspect ratios to achieve increasingly more noncircular versions of starting lens geometry. Starting with a given vertical diameter dimension, one would use the diametrical aspect ratio to define the horizontal diameter dimension for each family of values from 50 to 95% of the circular design and preferably from 60 to 95% of the circular design, and most preferably from 80 to 95% of the circular design, step 602. One then can calculate the initial thickness differential, step 603. This will be the starting point as well as the maximum value of thickness differential and accordingly designated as the 100% thickness differential. This process is repeated for each thickness differential between 50% and 100% of starting value using adequate steps or increments of thickness differentials for each desired diametrical aspect ratio option down to at most 50% non-circularity, typically in adequate non-circularity increments (preferably 1 to 5%), step 604. Once all permutations of diametrical aspect ratios and thickness differentials are defined, the design can be further optimized by evaluating by the impact of stiffness profile on the design, step 605. Specifically, applicants have discovered that additional benefits can be obtained in lens comfort while still achieving satisfactory rotational recovery for lens stabilization by the judicious placement of material particularly when designing large diameter noncircular lenses with thickness differentials present.

By proceeding in this fashion, one can create an optimized stiffness profile that is reduced from that of the typical toric lens stiffness profiles and thus improving comfort. These optimized stiffness profiles approach that of non-toric stiffness profiles while still ensuring adequate stabilization. Due to the non-circularity and large diameter of these lenses, they are more likely to interact with the limbal region of the ocular surface topography. Due to the changes in geometry of the ocular surface in this region, lens interaction with the ocular surface will be impacted by lens stiffness. This can result in bubble formation under the lens, or other situations such as lens awareness, conjunctival staining or impressions. As such, this also presents an opportunity to design lenses that have improved performance by interacting with the limbal region in a positive fashion. Bubbles formed by the entrapment of air (i.e.: the creation of air-pockets) under the contact lens when the lens is placed on eye can occur with large diameter lenses with less than optimal stiffness profiles. While the bubbles will dissipate in time due either to the bubble passing through the permeability of the lens material, or simply with lens movement by the bubble escaping from under the lens, one can minimize and/or mitigate the occurrence of these bubbles by designing an appropriate stiffness profile of the lens. Applicants have determined that additional reductions in stiffness profile of up to 50% of a previously optimized non-circular lens with 50 to 95% non-circularity and having an existing thickness differential of 0.1 to 0.4 mm can result in additional improvements in comfort, elimination or significant reduction of bubbles beneath the lens while still achieving satisfactory stabilization/recovery times. Testing by applicants have shown these additional reductions in stiffness profile to be preferably between 30 and 50%, as values above 50% start to negatively impact the stabilization/recovery of the lens position.

With the matrixed set of variables initially defined, step 606, the stabilization time for each permutation is calculated, along with predicted comfort and extent of eye wrapping, step 607; one can then populate the matrix with values and create the corresponding contour plot, step 608. While each starting design will yield differing results for the stabilization time contour plot, for designs of same family one can expect similar shapes and trends, even if not identical. The next step is to identify the preferred region on the resulting contour plot: by identifying the vertical thickness differential boundary between 50 and 100% depending on level of comfort to be maximized; identifying the lower limit of non-circularity as the horizontal floor of the preferred region depending on the ease of handling and ease of manufacturability; and determining the ideal stiffness profile as measured by area under the stiffness profile curve in which the upper limit is bounded by geometries whose effective areas approach but are somewhat less than a state of the art standard toric effective area, thus achieving a measurable improvement in comfort. On the other end, the lower limit is bounded by geometries whose effective areas are minimized in the direction of extremely comfortable state of the art non-toric lenses, but minimized only to the level where adequate stabilization is still achieved as measured by the rotational recovery time. Lastly, in accordance with the present invention, one identifies the maximum resulting contour line for stabilization time that is equal to or less than that of the contour line for the stabilization time for the normalized starting design to ensure equivalent or if desired, improved stabilization to ultimately select the optimal geometry, steps 609 and 610. If one determines that the region is not adequate in step 609, one can then repeat the process for diameters greater or less than the starting diameters, use of different thickness differentials or stiffness profiles separately or in combination, all to ascertain if these alternative inputs further improve comfort, handling, stabilization recovery times and ease of manufacturing by returning to step 601. This process can be repeated in an iterative fashion to achieve the desired and optimal results.

With the addition of stiffness profile as an additional design dimension, an optimized design in each of the three dimensions of the design space can be achieved which furthers improves that which can be achieved by optimizing only non-circularity and thickness differential in combination. The design optimization in the first two dimensions of the design space leverages the design parameters obtained with the two inputs of non-circularity and thickness differential visualized and displayed graphically as preferred region 49 of FIG. 4D. In accordance with the present invention, the optimized design in each of the three dimensions of the design space provides the additional input of stiffness profile as an additional design degree of freedom thus resulting in a transformation of the preferred region 49 of FIG. 4D from a two-dimensional design space into a three-dimensional design volume of which multiple solutions may exist. This representative design volume 700 is illustrated graphically in FIG. 7. The three-dimensional design volume 700 is determined in a similar fashion as to how the two-dimensional preferred region 49 of FIG. 4D was determined. Referring to FIG. 7 again, preferred region 701 on the diametrical aspect-thickness differential plane was determined and is the equivalent of preferred region 49 of FIG. 4D. The only difference between preferred region 49 of FIG. 4D and preferred volume 700 of FIG. 7 being that we are now determining the minimum 702 and maximum 703 acceptable conditions of the impact of stiffness profile in addition to the optimal non-circularity and thickness differential values. These upper and lower conditions of the stiffness profile are related to the thickness differential as thickness is a component of both. Where stiffness profile differs from the thickness differential is that the applicants have determined that for a given noncircular lens with a thickness differential, where the material is placed is just as important to the amount of material being placed. And in so doing, one can realize additional reductions of stiffness profile without negatively impacting stabilization/recovery times. Applicants have determined in accordance with the present invention that the preferred minimum stiffness profile (702) is 0.021 MPa·mm$^3$ and that the preferred maximum stiffness profile (703) is 0.109 MPa·mm$^3$.

It will be instructive to provide a brief overview of some of the models employed by the applicant in assessing both the impact and optimization of geometric/mechanical lens configurations.

Rotational Recovery Model

Figure 8A:
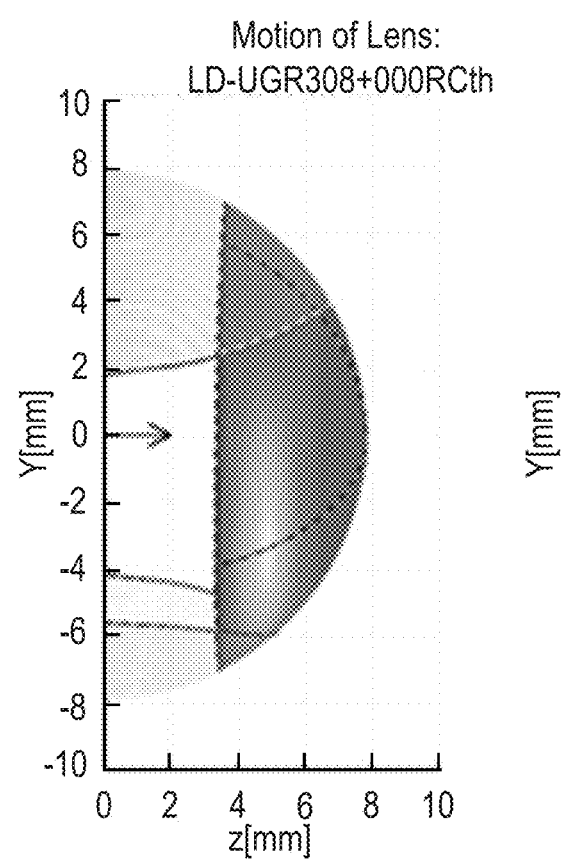

As previously stated, both rotation and stabilization are fundamental to an Astigmatic lens design. To better understand the impact of a specific lens stabilization feature, applicant has developed and utilizes a numerical Rotation and Centration model (designated RCM) which simulates rotation and centration of contact lenses on eye as a result of the Contact lens interacting with the eye. Specifically, this model, predicts lens movement (rotation/translation) as a function of lens geometry interacting with a model eye geometry. The model eye can be an individually well characterized eye, or a composite eye geometry representing population averages. The model includes eyelid dynamics which impart forces to the lens, and the material and geometric properties of both the lens and the eye are utilized to calculate the resulting movement (rotation/translation) of the contact lens while on eye. This model is effective at calculating the time required for a lens design to stabilize on the eye. One can displace or rotate the virtual lens, and after simulated blinking, the time required to stabilize can be determined. Thus, changing the geometry of the lens, will impact and change the resulting movement of the lens on eye, the resulting measurements for the various designs can then be compared and assessed. Representative output from this model is shown in FIG. 8.

Eye-Lid Comfort Model

Figure 9A:
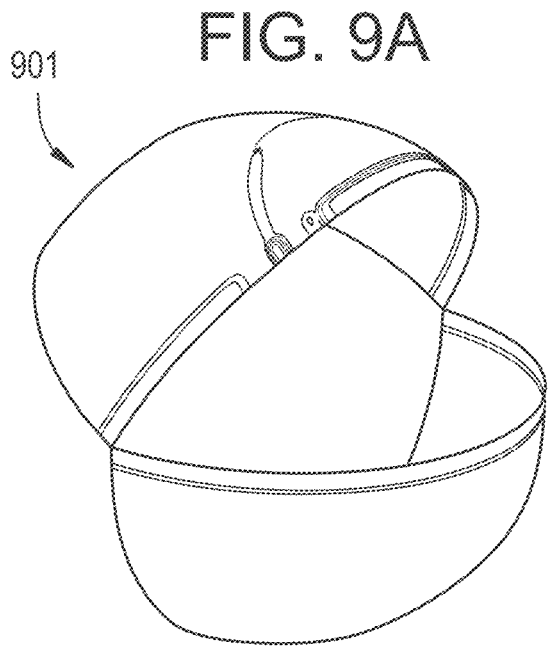
FIGS. 9A through 9F provide and compare a typical output from applicants Eyelid comfort model showing the results of three different design configurations and the impact each has on the stress state in the eyelid itself which in this case serves as a proxy for comfort. Specifically.
Figure 9B:
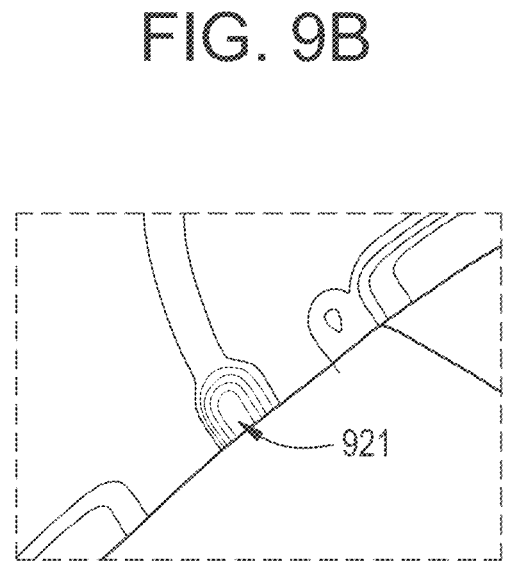
Figure 9C:
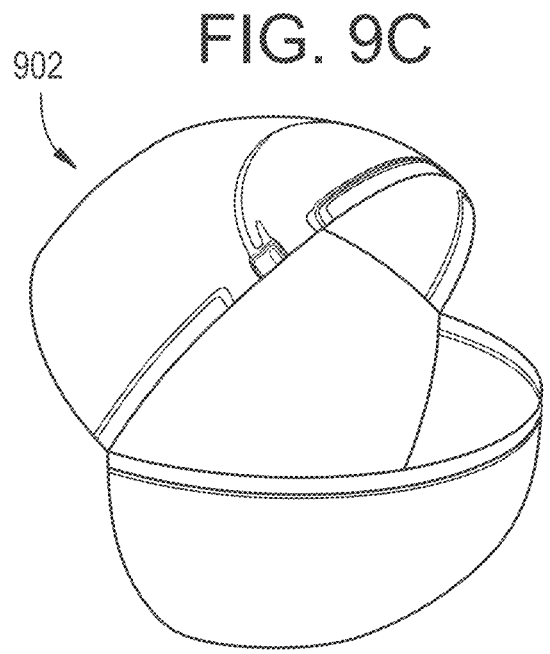
Figure 9D:
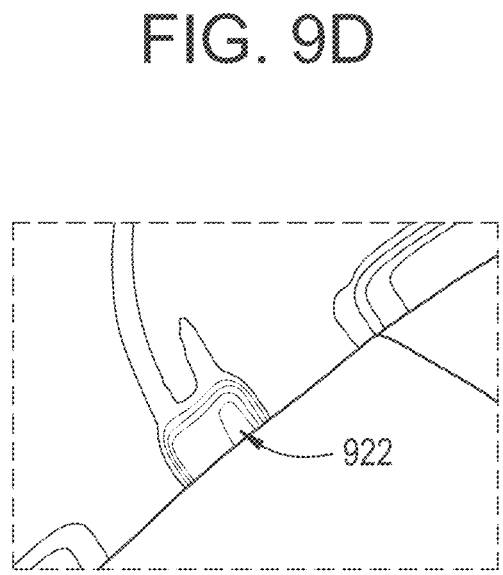
Figure 9E:
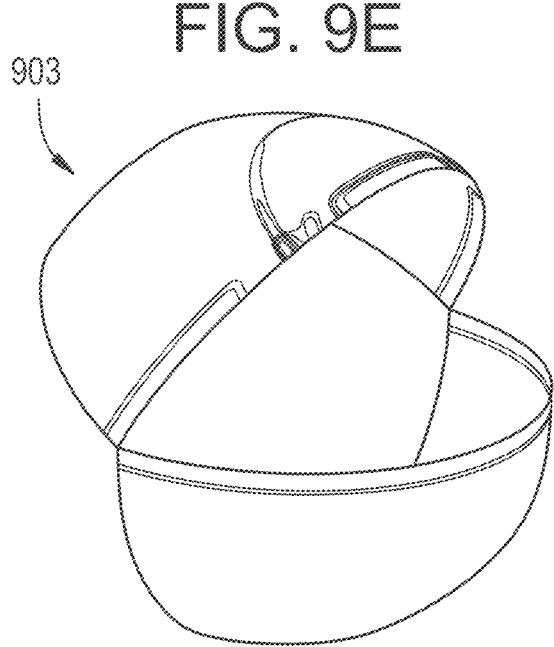
Figure 9F:
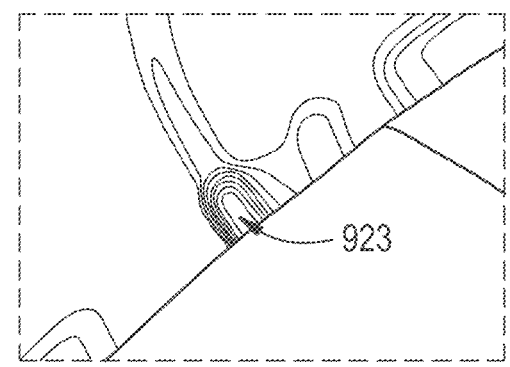

While stabilization of the contact lens on the cornea (i.e.: ocular surface) is vital, equally important is comfort. The conjunctiva is a mucous membrane of the eye covering both the cornea and inner surface of the eyelids and is highly vascularized and innervated thus making it very sensitive to the presence of a contact lens. Because of this, the interaction of the contact lens with the eye, and particularly with the eyelid and cornea, can be a primary factor in comfort. As illustrated in FIGS. 9A through 9F, an Eyelid Comfort Model was employed to assess various lens designs and the impact each has on comfort based upon the interaction of the contact lens with the eyelid. This eyelid comfort model can predict both contact pressure and shear strains exerted on the eyelid due to contact lens mechanical design aspects and their interaction with the ocular surface and the eyelid. Output using representative designs for a state of the art non-toric lens 901 as shown in FIG. 9A, and a state of the art toric lens 903 as shown in FIG. 9E are shown along with an optimized toric design 902 in accordance with the present invention as shown in FIG. 9C. The representative contour lines as shown in FIGS. 9A, 9C and 9D correspond to increasing levels of contact pressure levels in the upper eyelid resulting from contact lens wear. The corresponding enlarged details views (see FIGS. 9B, 9D, & 9F) show the area of maximum peak stress in the eyelid for each design and as one can see a lens of the present invention 902 can be seen to exert contact pressure substantially lower than the state of the art toric lens 903 and in line with the state of the art non-toric lens 901. As shown in FIGS. 9C & 9D, the peak stress state 922 for a lens in accordance with the present invention results in an equivalent level of peak stress to that in the eyelid with a non-toric lens 901 with peak stress state 921 as shown in FIGS. 9A & 9B. Contrasting these two peak stress states in the eyelid with the peak stress state 923 as shown in FIGS. 9E & 9F in the eyelid when it interacts with a state of the art toric lens 903 shows the significantly lower levels of stress. Specifically, when comparing the peak stress areas 921 and 922 to that of 923 applicants have analytically shown that the peak stress state in the eyelid interacting with a lens of the present invention reduces the peaks stress state by about 35% as compared to the peak stress state in an eyelid interacting with a traditional state of the art toric lens and furthermore the reduced peak stress state was found to be very similar to that of the best in class non-toric lens in terms of comfort. Specifically, even with different assumptions in model boundary conditions, all differences between the present invention and that of a state of the art non-toric lens were less than 10%. Thus, applicants have been able to optimize a lens design in accordance with the present invention that stabilizes equivalently to that of a state of the art toric lens, while achieving the comfort level (as measured by eyelid peak stress) of a best in class non-toric lens.

Virtual Determination of Lens Wrapping

Contact lens materials are extremely compliant which can facilitate the contact lens itself wrapping around the cornea resulting in a varied strain and thus stress state of the lens itself. This varied stress state can contribute to discomfort by the wearer of the lens. By using the state of stress within the lens and employing the finite element methodology, one can optimize a lens design to achieve more uniform distribution of stress within the lens when on eye. Lens edge design can also have a major impact to comfort, and taking this into account in coordination with the other design variables is important to achieve a design which satisfies these often-conflicting design requirements. How the lens fits or wraps on the corneal surface of the eye is an important determinate of a successful lens design. As may be seen in FIG. 10, evaluation and virtual assessment of contact lens wrapping can provide important insights that would allow one to optimize a design. Such optimization can address such items as preventing central buckling of a lens design, or the minimization of lifting of the lens over the limbus to prevent bubble formation, or to simply further optimize and achieve a more uniform distribution of contact stress imparted by the lens to the corneal or ocular surface of the eye. In this model, Finite Element Analysis is employed to compare competing designs to known designs with the goal of better understanding the stress state of the lens when it placed upon the corneal surface as illustrated in FIG. 10. A typical non toric lens (1001) has a fairly uniform contact stress state, as compared to a typical toric lens (1003) which has higher stress states in the area of the stabilization zones. In accordance with the present invention, the contact stress state of lens (1002) is more uniform much like the non-toric lens (1001) even with the presence of stabilization zones.

Stiffness profile is a function of both the material thickness and modulus of the material, thus for a given material (i.e.: modulus) where we place the material both radially and circumferentially can impact the stiffness profile. Likewise, different stiffness profiles can be achieved by simply modifying the modulus of the material. Because different placement or configurations of material will also affect the thickness, the dimension of stiffness profile is also related to thickness differential. The thickness profiles along multiple meridians when taken together and combined with the material modulus can be used to determine the stiffness profile. Thus, one can modify both the modulus and the placement of the material either alone or in combination to achieve varying stiffness profiles. To approximate lens stiffness for an axisymmetric lens, one can determine the stiffness profile by multiplying the elastic modulus of the lens material by the square of the thickness taken along a single meridian at distinct radial positions. (see equation 1 below)

$$\text{Stiffness Profile} = E \times t^2 \quad \text{Equation 1}$$

Where E equals elastic modulus of the material and t equals thickness.

The area under the curve of the various stiffness profiles for each meridian can be used as a proxy for the stiffness profile, and since lens comfort is related to stiffness, these area measurements can be a proxy for comfort as well. To approximate the area under this curve, the thickness profile is broken into a fixed number of distinct segments of width w along the radial dimension, with the stiffness of each segment calculated by equation 1 and multiplied by width w. The total area is then summed across each segment.

Elastic modulus for silicone hydrogel and non-silicone hydrogel contact lenses can range from 0.4 to 1.6 MPA depending on formulation and the presence or absence of silicone, with the silicone hydrogel contact lenses typically having a larger elastic modulus than the non-silicone hydrogel contact lenses.

Figure 11A:
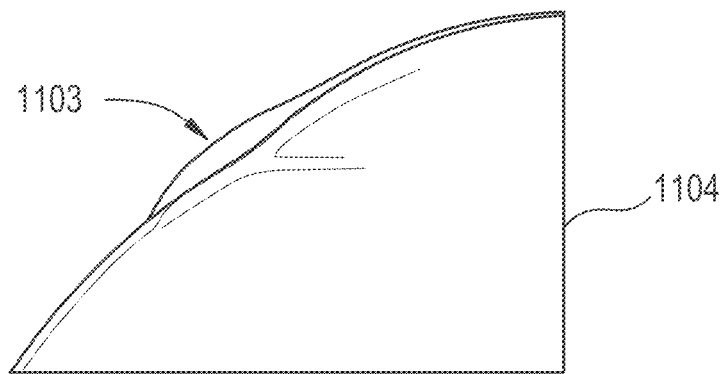
FIGS. 11A through 11C illustrate representative designs for a State of the Art Toric Lens, State of the Art Non-Toric Lens, and an optimized design in accordance with the present invention and how each interact with a typical eye surface topology.
Figure 11B:
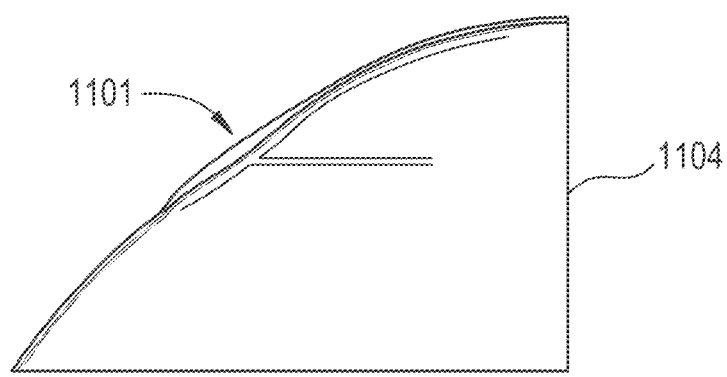
Figure 11C:
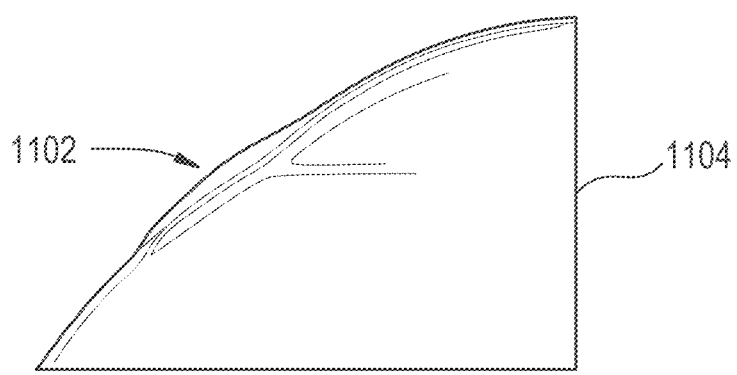

The series of three plots shown in FIG. 11, show the various lens designs represented as individual Finite Element Models showing various lens designs fitted onto the corneal or ocular surface of the eye (1104). FIG. 11A shows a cross-section of typical toric type lens (1103) fitted on the ocular surface (1104), clearly showing the thickened region of the lens stabilization zone in the limbal region. FIG. 11B shows a similar model with a non-toric type lens (1101) clearly showing the reduced thickness of the lens in the limbal region. FIG. 11C shows the lens in accordance with the present invention (1102) with an optimized stabilization zone and larger diameter along with optimized non-circularity, thickness differential, and a reduced stiffness profile.

Figure 12A:
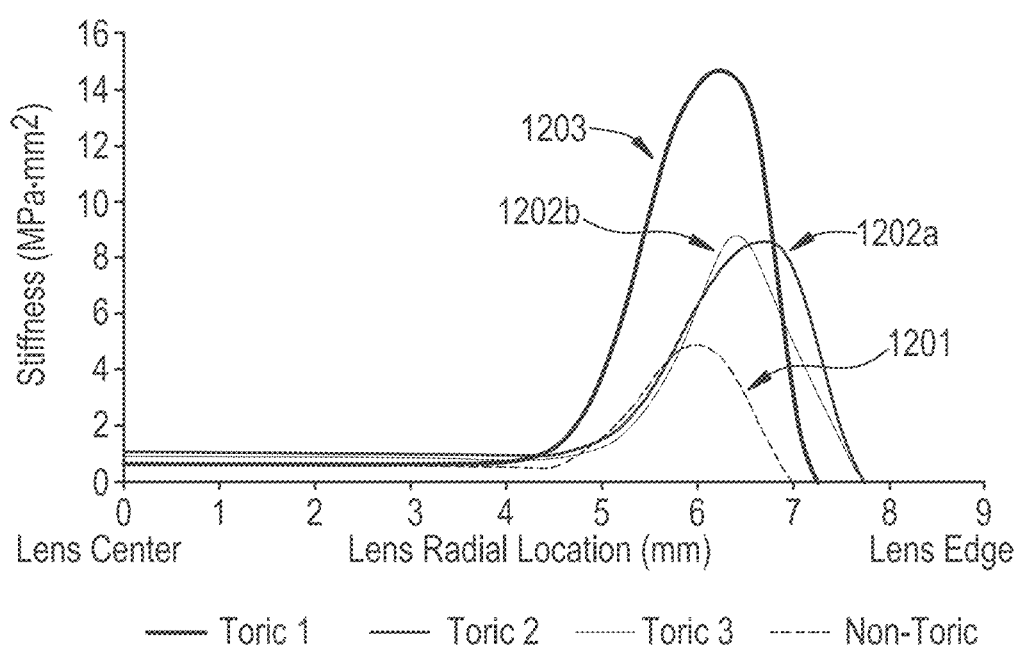
FIG. 12A illustrates the Stiffness profiles of a representative design in accordance with the present invention compared to multiple benchmark state of the art designs.

FIG. 12A shows the various stiffness profiles of both a typical toric (1203) and non-toric (1201) lenses along with the stiffness profile of two representative lenses in accordance with lenses of the present invention (1202a & 1202b). In this plot, the horizontal axis represents the radial profile of the lens, while the vertical axis represents the stiffness profile.

In both round and non-round lenses, as the major and minor diameters of the lens themselves get larger, the ocular surface geometry changes around the limbus becomes a consideration. On human eyes, this area of the limbus is typically located approximately 6 to 6.8 mm radially out from the center of the eye. The stiffness of the lens in this location is also important as that will have an impact with how the lens interacts with the ocular surface geometry. Toric type lenses are relatively stiffer in this area due to the presence of stabilization zones. Applicants have determined this interaction of the lens with the limbus area geometry to be important particularly as it relates to improving and optimizing stabilization or recovery times. An important consideration is to determine how fully or completely a lens will wrap and thus follow the surface profile or alternatively be stiff enough to vault over the limbal area. To allow for a fair comparison and noting that all toric type lenses are relatively stiffer in this region, we have excluded from the effective area, the radial zone from 6.0 to 6.8 mm where the ocular surface is most concave. This allows for a more reasonable comparison of effective area under the stiffness profile curve when comparing one lens design to another as well as comparing differing lens design types. (i.e.: non-toric to toric). Other interactions with large lenses and the limbal area include such items as bubble formation under the lens and lens awareness, conjunctival staining and/or impressions. Applicants have determined that this is another area where stiffness profile optimization can be utilized to mitigate and/or prevent the bubble formation and improve the situation regarding lens awareness, conjunctival staining and/or impressions.

Figure 12B:
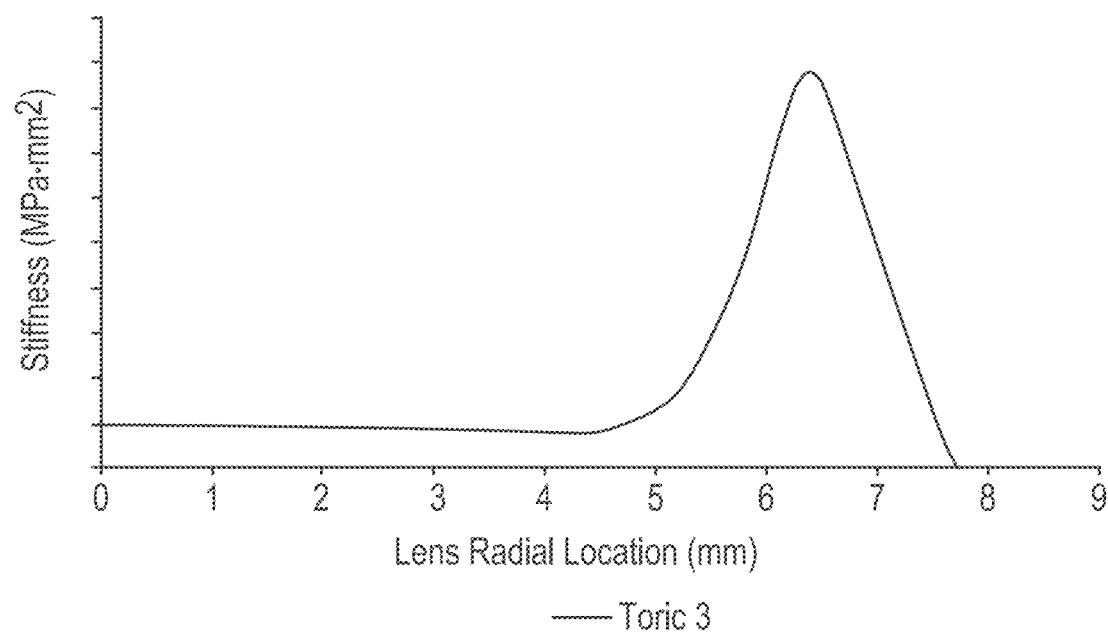
FIGS. 12B & 12C show how the effective area, (a proxy for stiffness profile and thus comfort) is determined.
Figure 12C:
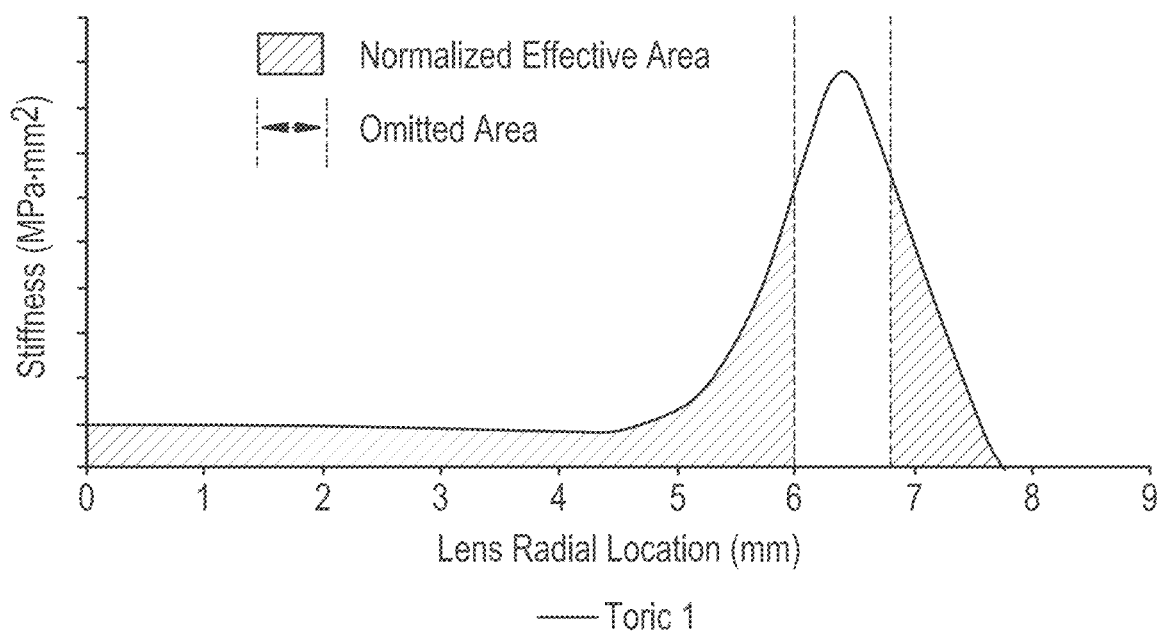

The methodology of the calculation and optimization of the stiffness profile, can be better understood with an example, as shown in FIGS. 12B and 12C. FIG. 12B shows a typical stiffness profile of a lens based upon radial position from the lens center to its outside edge. FIG. 12C shows this same plot with the area under the stiffness profile curve in the region of the limbus excluded. (designated as the omitted area). The remaining area under the curve, (designated as the normalized effective area) is the area used to compare relative stiffness profiles from one lens configuration/type to another. It is the optimization (and reduction) of this effective area under the stiffness profile curve that embodies the third dimension of this design space. Applicants calculated the effective area (i.e.: proxy for effective stiffness ($E \times t^2 \times w$)) of a traditional non-toric lens without stabilization zones, as well as that of a traditional toric lens with stabilization zones. These effective areas which do not include the omitted area under the curve in the limbal region (6.0 to 6.8 mm) range from about 0.04 to 0.05 MPamm$^3$ for a traditional non-toric lens design to about 0.10 to 0.11 MPamm$^3$ for a traditional toric lens design. The larger effective area for the traditional toric lenses is due to the presence of the stabilization zones which tend to be of increased thickness. Applicants have designed and optimized several lens shapes which achieve an equivalent stabilization effectiveness but with reduced stiffness profiles, essentially resulting in about 35% to 50% reductions in typical stiffness profiles of a traditional toric lens and thus an improvement in comfort. In accordance with an additional embodiment of the present invention, applicants have determined that by maximizing the ratio of the omitted area over the effective area one can further improve the lens performance both in terms of comfort and bubble reduction. In accordance with the present invention, the table 1 shown below summarizes the interaction with both the varying elastic modulus coupled with the effective area reductions as suggested by the applicants.

TABLE 1

| | Elastic Modulus | Normalized Effective Area* (mm$^3$) | Resulting Stiffness Profile (MPamm$^3$) |
|---|---|---|---|
| High | 1.6 Mpa | 35% Reduction = 0.068 | 0.109 |
| | | 50% Reduction = 0.053 | 0.085 |
| Low | 0.4 Mpa | 35% Reduction = 0.068 | 0.027 |
| | | 50% Reduction = 0.053 | 0.021 |

*Using a starting traditional normalized effective area of 0.105 mm$^3$

Depending on if a low or high modulus material is used for the lens, an optimized stiffness profile can range from 0.021 to 0.109 MPa×mm$^3$ and when coupled with optimized non-circularity and optimized thickness differential can achieve both improved comfort and satisfactory stabilization.

Figure 13A:
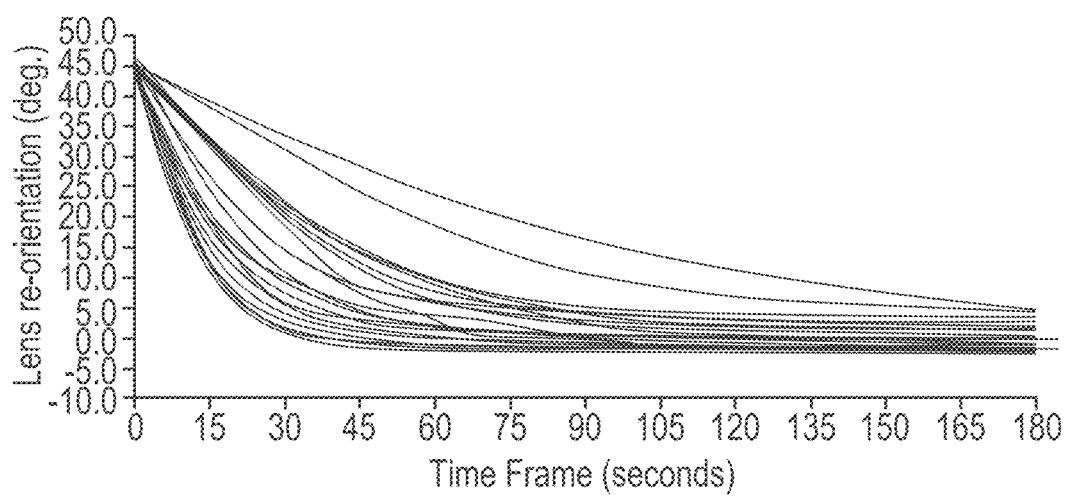
FIGS. 13A & 13B show the time it takes for the rotational recovery of two representative lens designs (i.e.: time it takes for a lens rotated out of position by 45 degrees to stabilize) calculated using the Virtual rotation-centration analytical model.
Figure 13B:
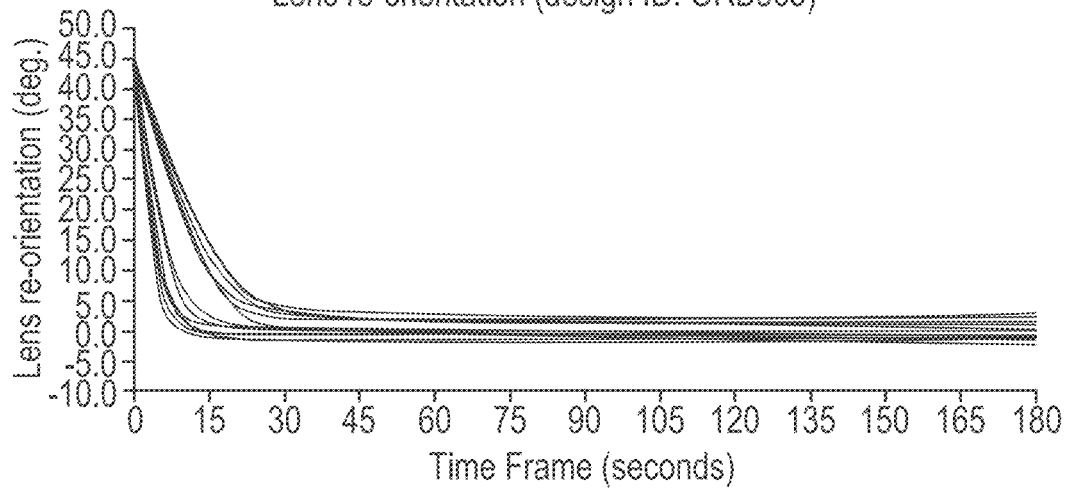
Figure 14A:
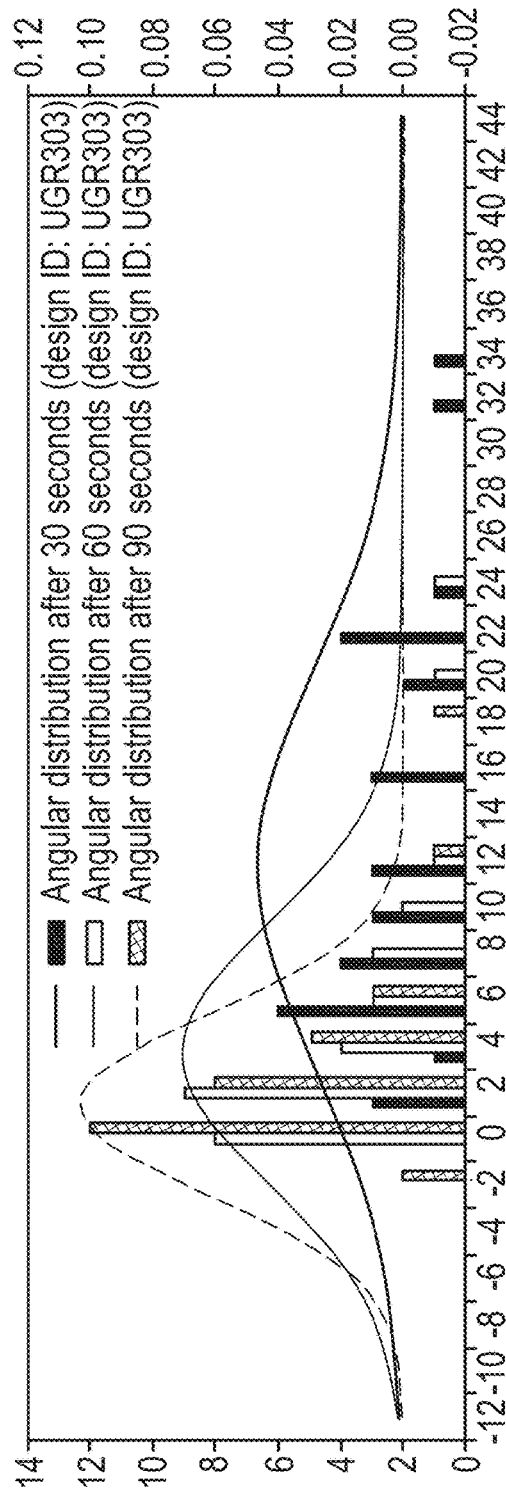
FIGS. 14A & 14B show the angular distribution of lens position temporally for two representative designs and how they significantly differ in terms of rotational recovery.
Figure 14B:
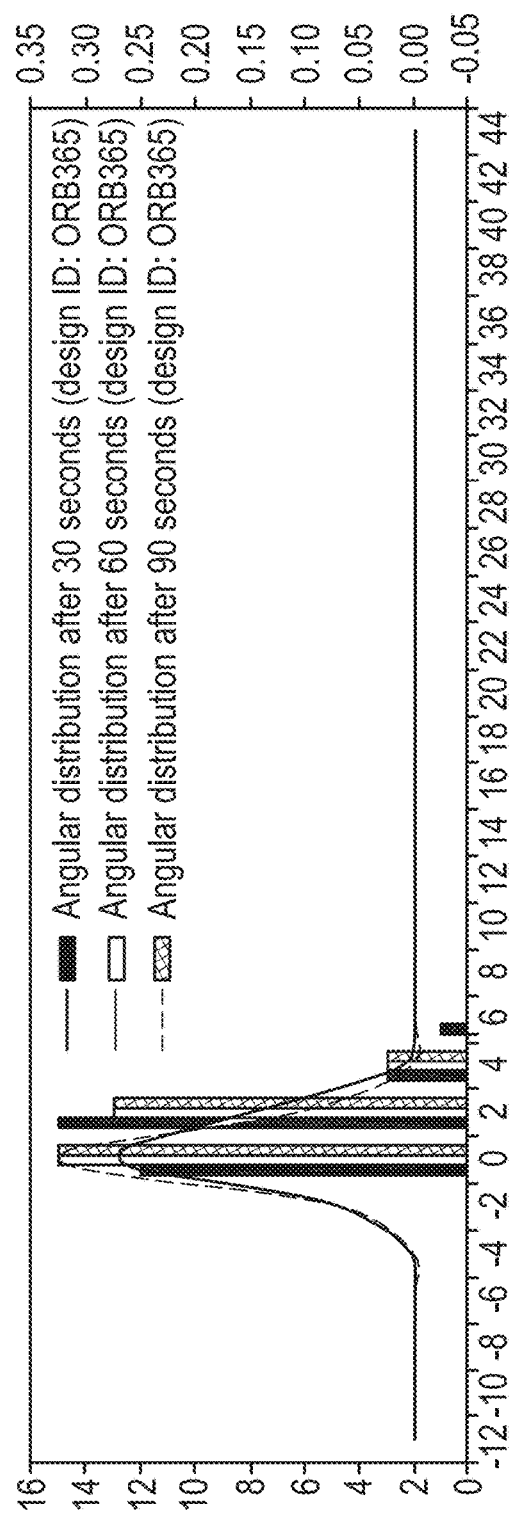

FIGS. 13A and 13B, show the various trials of the time it takes for a typical lens (FIG. 13A) and a lens in accordance with the present invention (FIG. 13B) to re-orientate itself when artificially repositioned 45 degrees from its optimal stabilized position. As one can see there exists a significant improvement when the combination and optimization of non-circularity, thickness differential and stiffness profile are utilized. FIGS. 14A and 14B, shows the distribution of angular position of the lenses for each of these trials, 30, 60 and 90 seconds after initial artificial repositioning of 45 degrees out of phase. Note the significant reduction in the extent of distribution in FIG. 14B which is for the lenses in accordance with the present invention as compared to FIG. 14A that of a typical traditional toric lens on the commercial market.

When all three design dimensions are optimized in accordance with applicant's invention, applicants have determined that the stress state of the lens is more favorable as it relates to comfort, which has been confirmed with clinical trials, that bubble formation is reduced has also been confirmed with clinical trials, and that stabilization and recovery time of the lens is more than satisfactory.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. A rotationally stabilized non-truncated contact lens comprising:
   an optic zone configured for correcting vision;
   a peripheral zone surrounding the optic zone and configured for providing rotational stability,
   wherein rotational stability is achieved optimizing at least three design factors including a non-circularity component, a thickness differential component, and a stiffness profile component.

2. The contact lens of claim 1 wherein the non-circularity component includes a first effective dimension defined by an inscribed diameter fit within the peripheral zone of the contact lens having a first center, and a second effective dimension defined by a circumscribed diameter around the peripheral zone of the contact lens having a second center where the ratio of the first effective dimension to the second effective dimension falls within a range from about 0.6 to about 0.95.

3. The contact lens of claim 1 wherein the thickness differential component having a maximum thickness and a minimum thickness, is defined by the difference between the maximum thickness and the minimum thickness.

4. The contact lens of claim 1 wherein the stiffness profile component can further reduce the thickness differential component up to about 50% without a measurable decrease in rotational stability.

5. The contact lens according to claim 2 wherein the inscribed diameter falls within a range from about 13.5 mm to about 14.5 mm.

6. The contact lens according to claim 2 wherein the circumscribed diameter falls within a range from about 14.0 mm to about 20.0 mm.

7. The contact lens according to claim 3 in which the thickness differential ranges from about 0.1 mm to about 0.4 mm.

8. The contact lens according to claim 2 wherein the ratio of the first effective dimension to the second effective dimension falls within the range from about 0.8 to about 0.95.

9. The contact lens according to claim 8 wherein the shape of the peripheral zone is asymmetric.

10. The contact lens according to claim 8 wherein the first center and second center are coincident.

11. The contact lens according to claim 8 wherein the first center and second center are non-coincident.

12. The contact lens according to claim 11 wherein the non-coincident centers lie on the same horizontal meridian.

13. The contact lens according to claim 11 wherein the non-coincident centers lie on the same vertical meridian.

14. A rotationally stabilized non-truncated contact lens comprising an optic zone configured for correcting astigmatism; a peripheral zone surrounding the optic zone and configured for providing rotational stability wherein the rotational stability is achieved by optimizing a combination of a non-circularity component of the lens, a thickness differential component of the lens, and a stiffness profile component of the lens, wherein the non-circularity component is between about 60% and about 95% of a true circle, the thickness differential component ranges from about 0.1 mm to about 0.4 mm, and the stiffness profile ranges from about 0.021 to about 0.109 MPa×mm$^3$.

15. The contact lens according to claim 14 wherein the stiffness profile of the lens is configured to smoothly and rapidly transitions from a first stiffness to a second stiffness immediately prior to the onset of a limbal region, wherein the second stiffness is greater than the first stiffness.

16. The contact lens according to claim 15 wherein the stiffness profile of the lens further comprises a stiffness ratio which is minimized, and wherein said stiffness ratio is defined as the sum of the stiffness profile inside the limbal region divided by the sum of the stiffness profile outside the limbal region.

17. The contact lens according to claim 16 wherein the stiffness ratio falls within the range from about 0.55 to about 0.65.

18. A method that optimizes the design of a stabilized contact lens while maximizing comfort on eye comprising the steps of: defining a matrixed set of peripheral geometries having a combination of at least three design parameters including a non-circularity component, a thickness differential component and a stiffness profile component, wherein the non-circularity component is defined as the ratio of the largest inscribed diameter divided by the smallest circumscribed diameter, wherein said ratio ranges from about 60% to about 95% from a true circle and the thickness differential component is defined as the additive thickness to the nominal thickness of the nominal thin portions of the lens wherein said thickness differential ranges from about 0.1 mm to about 0.4 mm and the stiffness profile component is defined as the effective area under the thickness profile curve less the area of the limbus multiplied by the elastic modulus of the lens material wherein said stiffness profile ranges from about 0.021 to about 0.109 MPa×mm$^3$, wherein the matrixed set includes a combination of at least two design parameters from the group consisting of at least two non-circularity values, a minimum of two thickness differential values, and a minimum of two stiffness profile values; calculating a time for the lens to stabilize on eye for a given set of matrixed values; creating a contour plot showing the time for the lens to stabilize for the values provided in the matrixed set; assessing the contour plot and defining a preferred region based upon at least one of three variables wherein the variables include maximizing comfort which is a function of lens thickness, minimizing time to stabilize, and minimizing manufacturing difficulty which is a function of non-circularity; selecting the peripheral geometry with at least two of the design parameters from the group consisting of a non-circularity component, a thickness differential component and a stiffness profile component which produces a time to stabilize within the preferred region; and fabricating a contact lens having at least two of the design parameters from the group consisting a selected non-circularity component, a corresponding selected thickness differential, and a selected stiffness profile.

* * * * *